US008661130B2

(12) United States Patent
Sonoda et al.

(10) Patent No.: US 8,661,130 B2
(45) Date of Patent: Feb. 25, 2014

(54) PROGRAM, METHOD, AND APPARATUS FOR DYNAMICALLY ALLOCATING SERVERS TO TARGET SYSTEM

(75) Inventors: Masataka Sonoda, Kawasaki (JP); Satoshi Tsuchiya, Kawasaki (JP); Kunimasa Koike, Kawasaki (JP); Atsuji Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 12/401,335

(22) Filed: Mar. 10, 2009

(65) Prior Publication Data
US 2009/0172168 A1 Jul. 2, 2009

Related U.S. Application Data

(63) Continuation of application No. PCT/JP2006/319590, filed on Sep. 29, 2006.

(51) Int. Cl.
*G06F 15/173* (2006.01)
*G06F 15/16* (2006.01)
*H04L 29/08* (2006.01)

(52) U.S. Cl.
CPC .............................. *H04L 29/08144* (2013.01)
USPC ........... 709/226; 709/200; 709/201; 709/202; 709/203; 709/204; 709/205; 709/206; 709/207; 709/217; 709/218; 709/219; 709/220; 709/221; 709/222; 709/223; 709/224; 709/225; 709/227; 709/228; 709/229; 714/3; 714/4.4; 714/4.1; 714/4.2; 714/4.3; 714/6.3; 714/13; 714/23; 714/24; 714/25; 714/37; 714/38.1; 714/38.12; 714/38.13; 714/38.14; 714/39; 714/43; 714/44; 714/50; 714/51; 714/56

(58) Field of Classification Search
USPC ......... 709/217, 219–221, 223–229, 200, 201, 709/202, 203, 204, 205, 206, 207, 218, 709/222; 714/3, 4, 4.1, 4.11, 4.2, 4.3, 4.4, 714/6.3, 13, 23, 24, 25, 37, 38.1, 38.12, 714/38.14, 39, 43, 44, 50, 51, 56, 38.13
See application file for complete search history.

(56) References Cited

U.S. PATENT DOCUMENTS 5,675,797 A * 10/1997 Chung et al. .................. 718/104
6,182,111 B1 * 1/2001 Inohara et al. ................. 709/201
(Continued)

FOREIGN PATENT DOCUMENTS

JP    A 7-271699    10/1995
JP    A 11-85707    3/1999
(Continued)

OTHER PUBLICATIONS

Takanobu Inayama, et al., "Realizing Autonomic Computing with Tivoli," Provision, vol. 11, No. 1, IBM Japan, Ltd., Dec. 2, 2004.
(Continued)

*Primary Examiner* — Saket K Daftuar
(74) *Attorney, Agent, or Firm* — Fujitsu Patent Center

(57) ABSTRACT

Server management data describes observed operating condition of a pool of spare servers. Based on a demand forecast of a specific target system, a dynamic allocation period is determined as a period during which the target system needs additional server resources to handle an expected demand. Based on the dynamic allocation period and server management data, a set of allocation candidates are nominated from the spare server pool, by eliminating therefrom spare servers which are likely to fail during the dynamic allocation period. An appropriate allocation candidate is then selected for allocation to the target system, such that the selected candidate will satisfy a specified requirement during its allocation period.

19 Claims, 22 Drawing Sheets

(56) References Cited

U.S. PATENT DOCUMENTS

| | | | |
|---|---|---|---|
| 6,334,196 B1* | 12/2001 | Smorodinsky et al. | 714/37 |
| 6,397,247 B1* | 5/2002 | Shirakawa et al. | 709/223 |
| 6,496,948 B1* | 12/2002 | Smorodinsky | 714/37 |
| 6,594,786 B1* | 7/2003 | Connelly et al. | 714/50 |
| 6,625,750 B1* | 9/2003 | Duso et al. | 714/11 |
| 6,691,065 B2* | 2/2004 | Hayashi et al. | 702/184 |
| 6,859,929 B1* | 2/2005 | Smorodinsky | 719/310 |
| 6,880,156 B1* | 4/2005 | Landherr et al. | 718/105 |
| 7,085,837 B2* | 8/2006 | Kimbrel et al. | 709/226 |
| 7,127,717 B2* | 10/2006 | Kawashimo et al. | 718/105 |
| 7,174,378 B2* | 2/2007 | Yoon et al. | 709/225 |
| 7,213,065 B2* | 5/2007 | Watt | 709/223 |
| 7,228,546 B1* | 6/2007 | McCarthy et al. | 718/104 |
| 7,240,234 B2* | 7/2007 | Morita et al. | 714/4.11 |
| 7,284,146 B2* | 10/2007 | Guimbellot et al. | 714/1 |
| 7,426,657 B2* | 9/2008 | Zorek et al. | 714/13 |
| 7,441,035 B2* | 10/2008 | Lakshmi Narayanan et al. | 709/227 |
| 7,516,383 B2* | 4/2009 | Hirano | 714/741 |
| 7,730,363 B2* | 6/2010 | Takezawa et al. | 714/47.1 |
| 7,761,745 B2* | 7/2010 | Garbow | 714/47.2 |
| 7,765,299 B2* | 7/2010 | Romero | 709/226 |
| 7,953,703 B2* | 5/2011 | Aggarwal et al. | 707/654 |
| 2002/0083118 A1* | 6/2002 | Sim | 709/105 |
| 2003/0126202 A1* | 7/2003 | Watt | 709/203 |
| 2003/0163734 A1* | 8/2003 | Yoshimura et al. | 713/201 |
| 2003/0220990 A1* | 11/2003 | Narayanan et al. | 709/220 |
| 2004/0054780 A1* | 3/2004 | Romero | 709/226 |
| 2004/0103194 A1* | 5/2004 | Islam et al. | 709/225 |
| 2004/0111509 A1* | 6/2004 | Eilam et al. | 709/224 |
| 2004/0153866 A1* | 8/2004 | Guimbellot et al. | 714/47 |
| 2005/0027486 A1* | 2/2005 | Kitada et al. | 702/185 |
| 2005/0091215 A1* | 4/2005 | Chandra et al. | 707/10 |
| 2005/0102674 A1* | 5/2005 | Tameshige et al. | 718/100 |
| 2005/0131993 A1* | 6/2005 | Fatula, Jr. | 709/202 |
| 2006/0010101 A1* | 1/2006 | Suzuki et al. | 707/2 |
| 2006/0136490 A1* | 6/2006 | Aggarwal et al. | 707/103 R |
| 2006/0168224 A1* | 7/2006 | Midgley | 709/226 |
| 2007/0101202 A1* | 5/2007 | Garbow | 714/47 |
| 2007/0214267 A1* | 9/2007 | Ogura et al. | 709/226 |
| 2007/0250608 A1* | 10/2007 | Watt | 709/222 |
| 2007/0292145 A1* | 12/2007 | Drose et al. | 399/8 |
| 2008/0240686 A1* | 10/2008 | Nagaya et al. | 386/124 |

FOREIGN PATENT DOCUMENTS

| | | |
|---|---|---|
| JP | A 11-126195 | 5/1999 |
| JP | A 2001-101134 | 4/2001 |
| JP | B2 3270012 | 1/2002 |
| JP | A 2002-163241 | 6/2002 |
| JP | A 2005-141605 | 6/2005 |
| JP | A 2005-182796 | 7/2005 |
| JP | A 2005-539298 | 12/2005 |
| JP | A 2006-24017 | 1/2006 |
| WO | WO 2004/023757 A1 | 3/2004 |

OTHER PUBLICATIONS

Takanobu Inayama, et al., "Realizing Autonomic Computing with Tivoli," Provision, vol. 11, No. 1, IBM Japan, Ltd., pp. 36 to 42; Feb. 12, 2004.

* cited by examiner

FIG. 4A  SINGLE LAYER SYSTEM
(NON- REDUNDANT DESIGN)
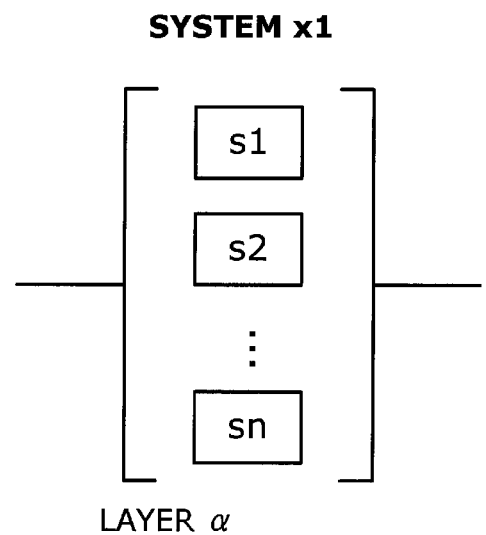
FIG. 4B  MULTILAYER SYSTEM
(NON- REDUNDANT DESIGN)
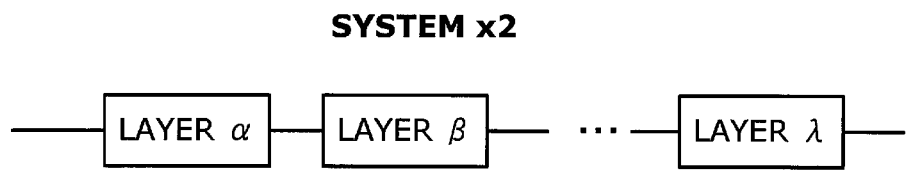

FIG. 5    REDUNDANT MULTILAYER SYSTEM
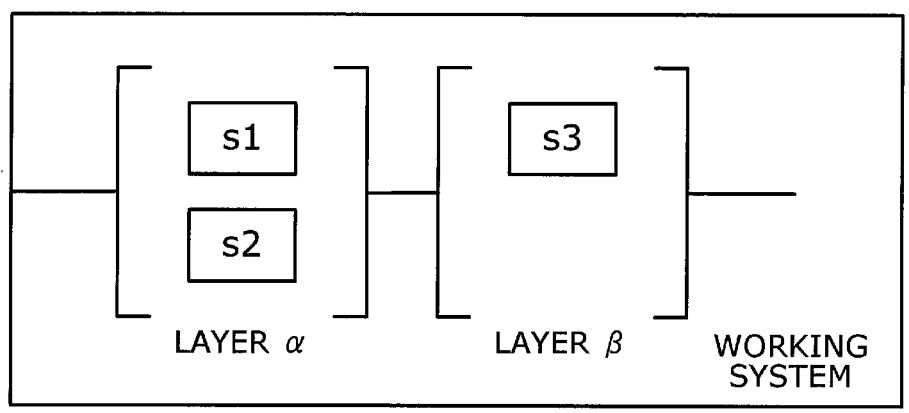
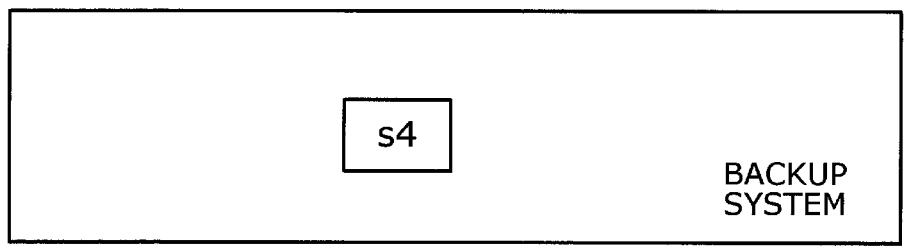

FIG. 7

| SERVER ID | MODEL | PERFOR-MANCE INDEX | RELIABILITY DATA | | | | ALLOCA-TION COST | ALLOCA-TION STATUS |
|---|---|---|---|---|---|---|---|---|
| | | | MTTF | CRT | RCRT | AVAILA-BILITY | | |
| s3 | T1 | 50 | 720 | 504 | 216 | 0.9704 | y | |
| s4 | T1 | 50 | 720 | 504 | 216 | 0.9704 | y | x2 |
| s5 | T2 | 60 | 800 | 672 | 128 | 0.9600 | 5y | |
| s6 | T3 | 90 | 780 | 336 | 244 | 0.9901 | 10y | |

FIG. 12

|  | MODEL | PERFOR-MANCE INDEX | RELIABILITY DATA | | | | ALLOCA-TION STATUS |
|---|---|---|---|---|---|---|---|
|  |  |  | MTTF | CRT | RCRT | AVAILA-BILITY |  |
| m1 | T1 | 50 | 800 | 504 | 296 | 0.9697 | xa |
| m2 | T1 | 50 | 820 | 504 | 316 | 0.9704 | xa |
| m3 | T1 | 50 | 900 | 504 | 396 | 0.9740 | xa |
| m4 | T1 | 50 | 720 | 600 | 120 | 0.9677 |  |
| m5 | T1 | 50 | 705 | 600 | 105 | 0.9671 |  |
| m6 | T1 | 50 | 660 | 500 | 160 | 0.9635 |  |
| m7 | T1 | 50 | 645 | 450 | 195 | 0.9627 |  |
| m8 | T1 | 50 | 610 | 336 | 274 | 0.9606 |  |
| m9 | T1 | 50 | 300 | 200 | 100 | 09174 |  |
| m10 | T2 | 90 | 1,200 | 504 | 696 | 0.9709 | xa |
| m11 | T2 | 90 | 1,000 | 504 | 496 | 0.9653 | xa |
| m12 | T2 | 90 | 360 | 168 | 192 | 0.9091 |  |

210

FIG. 13A  DEMAND FORECASTS

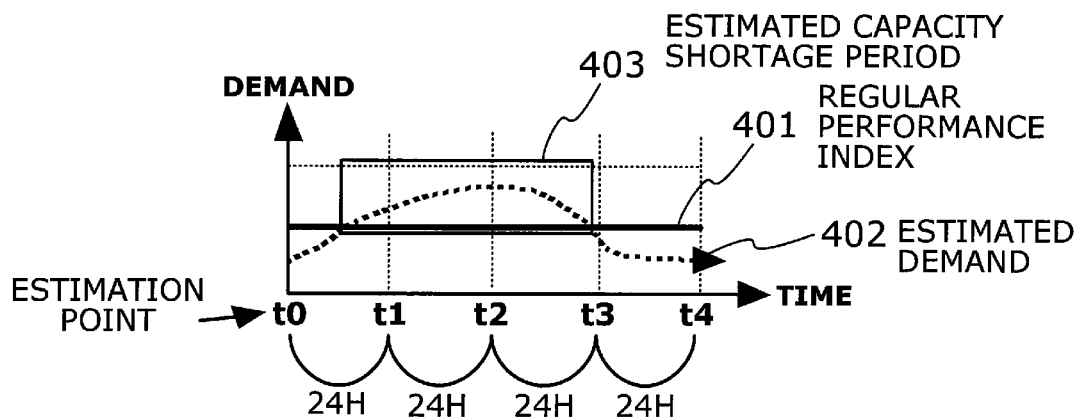

FIG. 13B  SYSTEM STATE AT TIME t0

410

|  | WEB LAYER | APPLICATION LAYER | DATABASE LAYER |
|---|---|---|---|
| RESOURCE CONFIGURATION | m1,(m3) | m2,(m3) | m10,(m11) |
| SYSTEM PERFORMANCE INDEX | 50 | 50 | 90 |
| ESTIMATED DEMAND | 40 | 30 | 30 |
| WORKING SYSTEM AVAILABILITY | 0.9697 | 0.9704 | 0.9709 |

FIG. 13C  SYSTEM STATE AT TIME t2 (PEAK DEMAND)

411

|  | WEB LAYER | APPLICATION LAYER | DATABASE LAYER |
|---|---|---|---|
| RESOURCE CONFIGURATION | m1,(m3) | m2,(m3) | m10,(m11) |
| SYSTEM PERFORMANCE INDEX | 50 | 50 | 90 |
| ESTIMATED DEMAND | 80 | 60 | 60 |
| WORKING SYSTEM AVAILABILITY | 0.9697 | 0.9704 | 0.9174 |

FIG. 14A  SYSTEM STATE AT TIME t2 (m4 ALLOCATED)

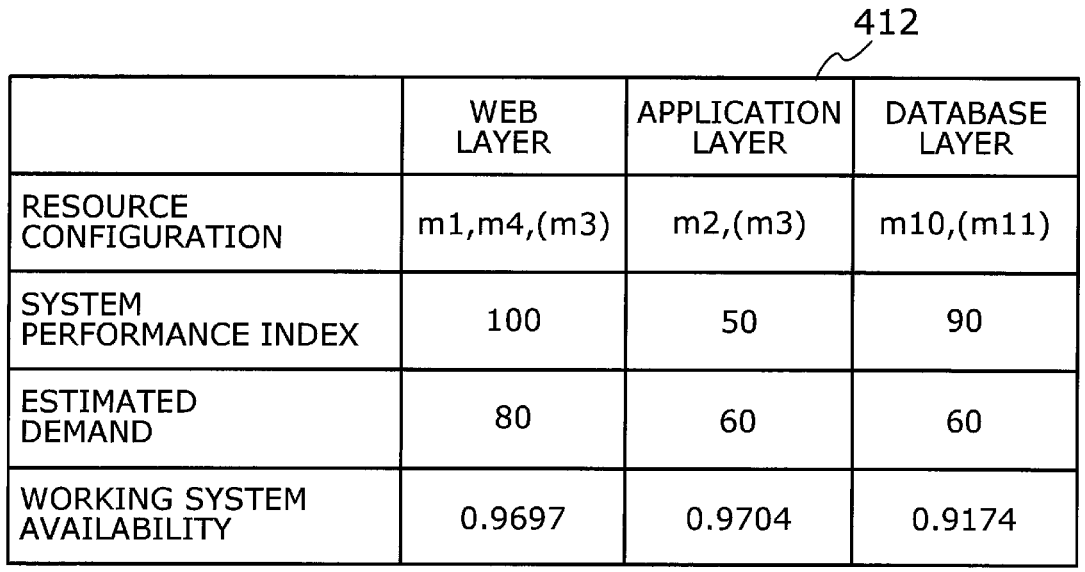

|  | WEB LAYER | APPLICATION LAYER | DATABASE LAYER |
|---|---|---|---|
| RESOURCE CONFIGURATION | m1,m4,(m3) | m2,(m3) | m10,(m11) |
| SYSTEM PERFORMANCE INDEX | 100 | 50 | 90 |
| ESTIMATED DEMAND | 80 | 60 | 60 |
| WORKING SYSTEM AVAILABILITY | 0.9697 | 0.9704 | 0.9174 |

FIG. 14B  SYSTEM STATE AT TIME t2 (m4 & m5 ALLOCATED)

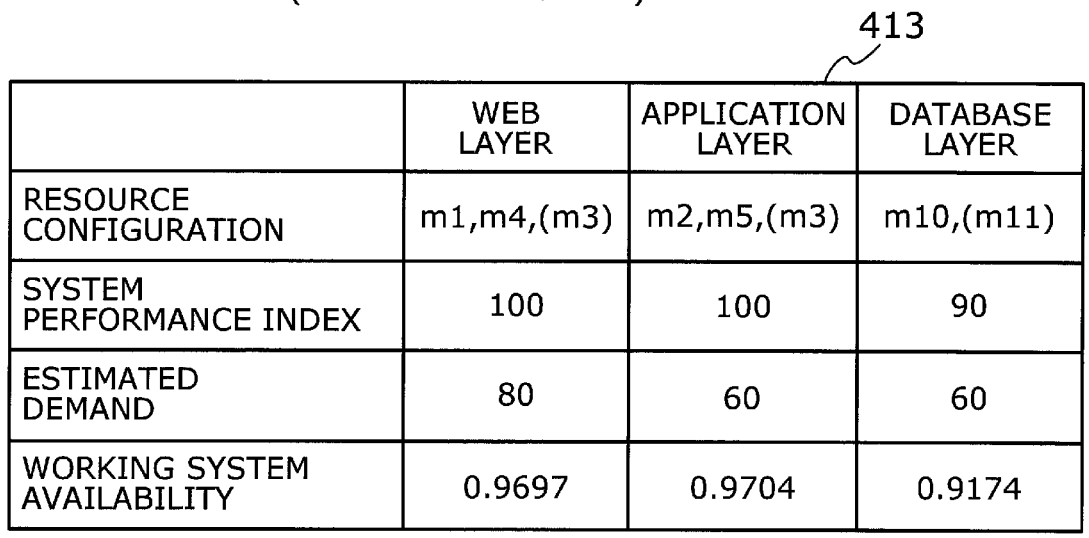

|  | WEB LAYER | APPLICATION LAYER | DATABASE LAYER |
|---|---|---|---|
| RESOURCE CONFIGURATION | m1,m4,(m3) | m2,m5,(m3) | m10,(m11) |
| SYSTEM PERFORMANCE INDEX | 100 | 100 | 90 |
| ESTIMATED DEMAND | 80 | 60 | 60 |
| WORKING SYSTEM AVAILABILITY | 0.9697 | 0.9704 | 0.9174 |

FIG. 15A

SYSTEM AVAILABILITY AFTER
PERFORMANCE-BASED SERVER ALLOCATION 421

| | WEB LAYER | APPLICATION LAYER | DATABASE LAYER | OVELALL |
|---|---|---|---|---|
| RESOURCE CONFIGURATION | m1,m4,(m3) | m2,m5,(m3) | m10(m11) | |
| AVAILABILITY | 0.9915 | | 0.9994 | 0.9909 |

FIG. 15B

SYSTEM AVAILABILITY AFTER
RELIABILITY-BASED SERVER ALLOCATION 422

| | WEB LAYER | APPLICATION LAYER | DATABASE LAYER | OVELALL |
|---|---|---|---|---|
| RESOURCE CONFIGURATION | m1,m4, (m3,m6) | m2,m5, (m3,m6) | m10(m11) | |
| AVAILABILITY | 0.9994 | | 0.9994 | 0.9976 |

FIG. 18

| | MODEL | PERFOR-MANCE INDEX | RELIABILITY DATA | | | | ALLOCA-TION COST | ALLOCA-TION STATUS |
|---|---|---|---|---|---|---|---|---|
| | | | MTTF | CRT | RCRT | AVAILA-BILITY | | |
| ma | T1 | 50 | 720 | 504 | 216 | 0.9704 | y | xb |
| mb | T1 | 50 | 720 | 504 | 216 | 0.9704 | y | xb |
| mc | T1 | 50 | 720 | 504 | 216 | 0.9704 | y | |
| md | T1 | 50 | 720 | 504 | 216 | 0.9600 | y | |
| me | T1 | 50 | 720 | 672 | 48 | 0.9651 | y | |
| mf | T1 | 50 | 720 | 672 | 48 | 0.9600 | y | |
| mg | T2 | 90 | 800 | 336 | 464 | 0.9901 | 10y | |
| mh | T2 | 90 | 800 | 336 | 464 | 0.9852 | 10y | |

SYSTEM STATE AT ESTIMATED PEAK DEMAND    510

|  | WEB LAYER |
|---|---|
| RESOURCE CONFIGURATION | ma,(mb) |
| SYSTEM PERFORMANCE INDEX | 50 |
| ESTIMATED DEMAND | 120 |
| TOTAL COST OF DYNAMIC ALLOCATION | 0 |

FIG. 19B

SYSTEM STATE AT ESTIMATED PEAK DEMAND AFTER ALLOCATION OF mc    511

|  | WEB LAYER |
|---|---|
| RESOURCE CONFIGURATION | ma,mc,(mb) |
| SYSTEM PERFORMANCE INDEX | 100 |
| ESTIMATED DEMAND | 120 |
| TOTAL COST OF DYNAMIC ALLOCATION | y |

FIG. 19C

SYSTEM STATE AT ESTIMATED PEAK DEMAND AFTER ALLOCATION OF md    512

|  | WEB LAYER |
|---|---|
| RESOURCE CONFIGURATION | ma,mc,md,(mb) |
| SYSTEM PERFORMANCE INDEX | 150 |
| ESTIMATED DEMAND | 120 |
| TOTAL COST OF DYNAMIC ALLOCATION | 2y |

FIG. 20

SYSTEM AVAILABILITY AFTER PERFORMANCE-BASED ALLOCATION

|  | WEB LAYER |
|---|---|
| RESOURCE CONFIGURATION | ma,mc,md,(mb) |
| SYSTEM PERFORMANCE INDEX | 150 |
| ESTIMATED DEMAND | 120 |
| OVERALL AVAILABILITY | 0.9941 |
| TOTAL COST OF DYNAMIC ALLOCATION | 2y |

FIG. 21

SYSTEM AVAILABILITY AFTER ALTERNATIVE ALLOCATION

|  | WEB LAYER |
|---|---|
| RESOURCE CONFIGURATION | ma,mc,md,(mb,me) |
| SYSTEM PERFORMANCE INDEX | 150 |
| ESTIMATED DEMAND | 120 |
| OVERALL AVAILABILITY | 0.9997 |
| TOTAL COST OF DYNAMIC ALLOCATION | 3y |

PROGRAM, METHOD, AND APPARATUS FOR DYNAMICALLY ALLOCATING SERVERS TO TARGET SYSTEM

CROSS-REFERENCE TO RELATED APPLICATIONS

This application is a continuing application, filed under 35 U.S.C. §111(a), of International Application PCT/JP2006/319590, filed Sep. 29, 2006.

FIELD

The embodiments discussed herein are related to a program, method, and apparatus for allocating servers to a target system.

BACKGROUND

Internet-based services have been growing in coverage and scale. Various kinds of services are provided in various application fields, attracting an increasing number of users. Since the Internet can be accessed from anywhere at any time, the systems operating such services tend to experience significant variations of demand. Preparing server resources for peak demand could therefore lead to overcapacity in ordinary times, wasting most resources. Stated in reverse, optimizing the amount of server resources for ordinary usage could result in shortage of processing capacity at the time of peak demand and a consequent loss of business opportunity.

Utility computing (UC) techniques have been developed as a solution for the above problem. UC systems optimize the allocation of server resources dynamically in accordance with time-varying demand. "Capacity on Demand" (CoD) is another name of this type of techniques.

FIG. 22 is a simplified block diagram depicting an Internet data center (IDC) as an example of a UC system. The illustrated IDC 900 is formed from systems 910 and 920 serving UC users, a server pool 930, and an IDC manager 940.

One system 910 includes a service providing section 911 to provide services, and a system manager 912 to manage the system 910. Another system 920 includes a working system 921a and a backup system 921b constituting a service providing section 921 with a dual-redundant structure. Also included in the system 920 is a system manager 922.

The server pool 930 is a collection of spare servers 931, 932, . . . for shared use by a plurality of IDC users. Each system 910 and 920 is formed from as many servers as necessary to handle regular demand from clients 961 and 962 on the Internet 950. Those systems may, however, encounter a surge of demand exceeding their processing capacity. In such a case, the IDC manager 940 supplies the requesting system with as many spare servers 931, 932, . . . as necessary, out of the shared server pool 930.

The above mechanism permits the systems 910 and 920 to receive a sufficient amount of server resources when they are necessary. The service fees paid to the provider of IDC 900 is on a usage basis. The users of such IDC services enjoy several advantages, i.e., more choices for their IT investment, reduction of operational costs, and expedited solutions for their business.

Conventional UC systems determine which servers to allocate and how many servers to allocate, based on performance requirements (e.g., processing capacity of servers). When the demand increases, the UC system allocates servers to offer a minimum required performance. The UC system also uses demand estimation techniques to estimate variations of demand, thereby identifying a period when the expected demand may overwhelm the currently allocated servers. This period is referred to herein as an estimated capacity shortage period. By dynamically allocating servers based on such forecasts, the UC system can be prepared for an actual surge of demand.

The allocated servers work in a target system to satisfy its performance requirement. Such a target system is also designed to provide an enhanced reliability, not to stop providing services due to a server failure. The process of dynamic allocation thus selects servers taking it into consideration their differences in reliability. For example, Japanese Laid-open Patent Publication No. 07-271699 proposes a technique for allocating peripheral devices based on the failure rates of those individual peripheral devices.

Conventional UC systems, however, select servers for dynamic allocation, depending solely on performance requirements, rather than including reliability of servers. Performance indices used for this purpose depend on the model of servers and the clock frequency of their central processing units (CPU). The same servers with the same CPU clock frequency are regarded as having the same performance and thus treated equally in the dynamic allocation. Actually, however, those servers may have different levels of reliability even if they have comparable performance indices. More specifically, they have different failure rates, availabilities, mean time to failure (MTTF) values, mean time to repair (MTTR) values, or other reliability parameters, depending on how long they have been operating. (While MTBF, or mean time between failures, may be used as a synonym of MTTF, the rest of this description will use MTTF.) For this reason, server allocation based on performance requirements alone could select a server that performs satisfactorily at the moment but has a potential problem in its reliability. The lack of sufficient reliability could lead to degradation of services because of failure of allocated servers.

If such an unreliable server is failed, the UC system will replace that server with a newly allocated server to make up for the resulting shortage of processing capacity. This allocation of an alternative server is performed upon detection of a capacity shortage due to server failure. The UC system has therefore to operate for a while with insufficient server resources until the allocation is made, which could lead to a loss of business opportunity. Furthermore, the resulting downtime could spoil the system's reputation for reliability.

As can be seen from the above discussion, conventional UC systems have a drawback in their dynamic server allocation functions. Their lack of reliability makes it difficult to implement such functions in the applications that require reliability in the first place (e.g., financial systems and air-traffic control systems).

Those reliability-oriented systems often adopt a redundant structure, which replaces a working system with a backup system in case of failure. The design and setup of such a redundant system need work of human engineers. The system in operation may require additional servers to deal with an increased service demand. Each time the need for a modification to the system arises, the system engineers have to reconfigure the system manually, taking its performance and reliability into consideration. It is therefore difficult to apply the system to Internet-based services, the demand of which tends to vary significantly.

Some systems may refer to failure rates in determining which device to allocate, as mentioned earlier. Those systems, however, do not consider such a reliability requirement that the allocated devices are supposed to operate properly during the expected capacity shortage period.

SUMMARY

According to an aspect of the invention, there is provided a computer-readable storage medium encoded with a server allocation program for allocating servers to a target system. When executed on a computer, this server allocation program performs a process including the following operations: monitoring operating condition of spare servers that belong to a spare server pool; storing and managing server management data which describes the operating condition of the spare servers, together with information about performance of the spare servers; determining, based on demand forecast data or previously specified data about the target system, a dynamic allocation period during which the target system is expected to need allocation of the spare servers; estimating failure probabilities of the individual spare servers during the dynamic allocation period, based on the stored server management data; nominating a set of allocation candidates from the spare server pool according to the estimated failure probabilities of the individual spare servers during the dynamic allocation period; and selecting, based on the stored server management data, which allocation candidate to allocate to the target system, such that the selected allocation candidate will enable the target system to satisfy a specified requirement during the dynamic allocation period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B illustrate examples of non-redundant system configuration, wherein FIG. 4A illustrates a single-layer system, and FIG. 4B a multilayer system;

FIG. 5 illustrates an example of a redundant multilayer system;

FIG. 7 illustrates a server management database according to the present embodiment;

FIG. 12 illustrates an example of server management data corresponding to the multilayer system of FIG. 11;

FIGS. 13A, 13B, and 13C illustrate demand forecasts for the multilayer system of FIG. 11, wherein FIG. 13A is a graph indicating how the estimated demand varies with time, wherein FIG. 13B is a table representing expected system state at time point t0, and wherein FIG. 13C is a table representing expected system state at time point t2 when the system experiences a peak demand;

FIGS. 14A and 14B represent a status of the multilayer system of FIG. 11 after server allocation, wherein FIG. 14A is a system state table that represents an expected system state at time point t2, assuming allocation of server m4, and wherein FIG. 14B is a system state table that represents a system state at time point t2, assuming allocation of server m5;

FIGS. 15A and 15B illustrate availability of the multilayer system of FIG. 11 after server allocation, wherein FIG. 15A illustrates availability of the system after a performance-based server allocation process, and wherein FIG. 15B illustrates availability of the system after a reliability-based server allocation process;

FIG. 18 gives an example of server management data for the system illustrated in FIG. 17;

FIGS. 19A, 19B, and 19C illustrate how the system of FIG. 17 changes, wherein FIG. 19A is a table representing a system state at the time of peak demand, wherein FIG. 19B is a table representing the same in the case where server mc is allocated, and wherein FIG. 19C is a table representing the same in the case where server md is further allocated;

FIG. 20 indicates availability of the system of FIG. 17 after server allocation;

FIG. 21 indicates availability of the system of FIG. 17 with an alternative server allocation.

DESCRIPTION OF EMBODIMENTS

Figure 1:
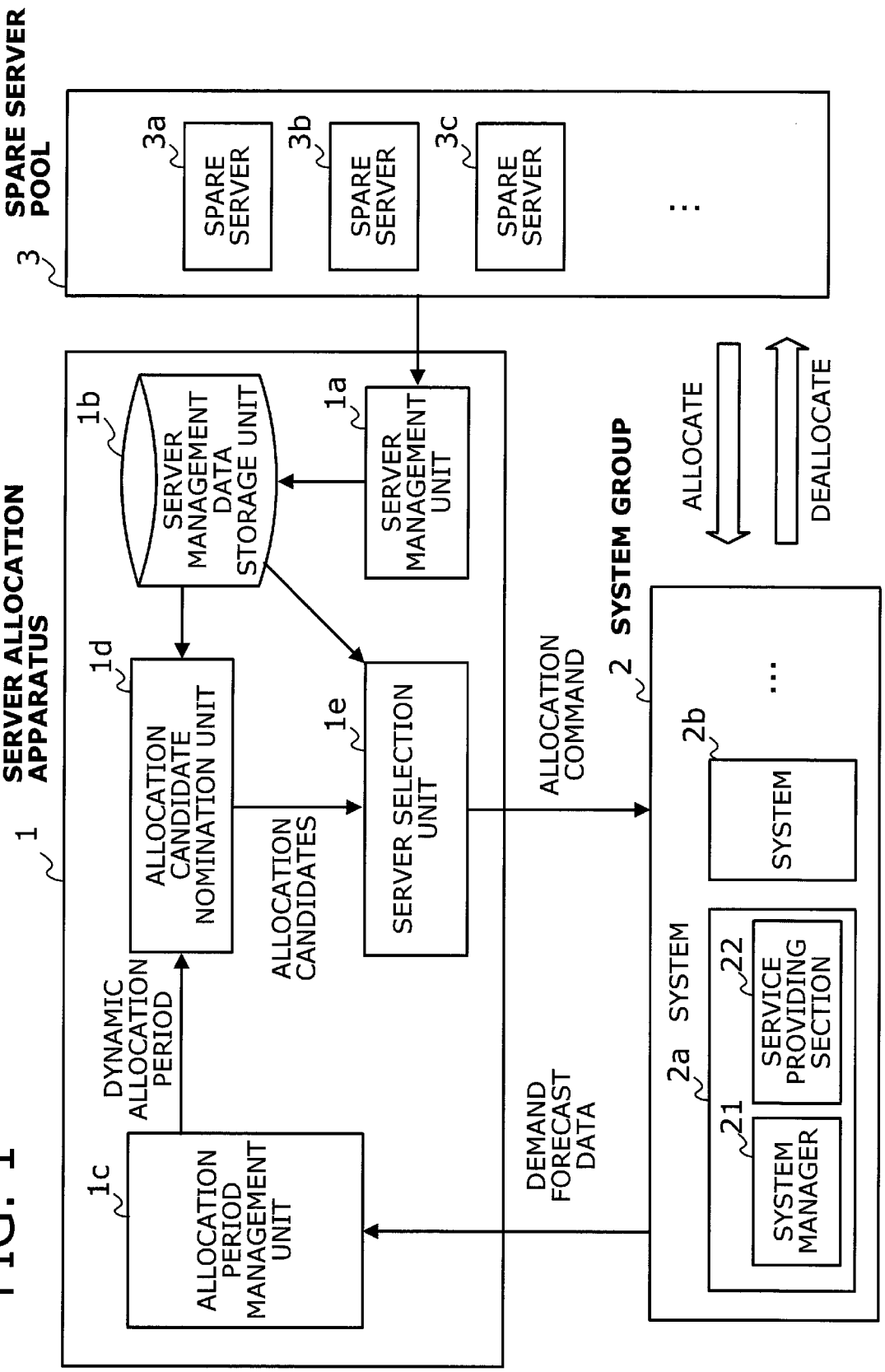
FIG. 1 gives an overview of an embodiment of the invention.

Embodiments of the present invention will be described below with reference to the accompanying drawings, wherein like reference numerals refer to like elements throughout. The description begins with an overview of the embodiments to be discussed herein and then proceeds to the details of those embodiments.

FIG. 1 gives an overview of a server allocation apparatus 1 according to an embodiment of the present invention. This server allocation apparatus 1 dynamically allocates spare servers 3a, 3b, and 3c from a spare server pool 3 to systems 2a and 2b belonging to a system group 2 in accordance with estimated demand on those systems 2a and 2b. While FIG. 1 illustrates only two servers in the system group 2 and three servers in the spare server pool 3, there is no particular limitation in the number of such servers.

Each system 2a and 2b constituting the system group 2 includes a system manager 21 to manage that system and a service providing section 22 to provide services to clients. The service providing section 22 is formed from at least a minimum required number of servers for providing services upon request from clients. The systems 2a and 2b may be organized as a redundant system as necessary. If this is the case, each such system includes a working system and a backup system. The system manager 21 observes the amount of demand on the system that it manages, and subjects the resulting data to an appropriate demand estimation technique, thus estimating future demands. This demand estimation may be based on some previously defined conditions. The system manager 21 produces demand forecast data for each system 2a and 2b and sends it to the server allocation apparatus 1. The system manager 21 may be configured to send this demand forecast data together with a request for allocation of spare servers in the case where the corresponding system 2a and 2b is expected to encounter a large demand exceeding its processing capacity.

The spare server pool 3 is a collection of spare servers 3a, 3b, and 3c under the management of the server allocation apparatus 1. Upon demand, all or part of those spare servers 3a, 3b, and 3c are selected and allocated to systems 2a and 2b. When the demand falls off, the allocated servers are deallocated from the system and returned to the spare server pool 3. The server allocation apparatus 1 monitors operating condition of each such spare server 3a, 3b, and 3c.

The server allocation apparatus 1 includes a server management unit 1a, a server management data storage unit 1b, an allocation period management unit 1c, an allocation candidate nomination unit 1d, and a server selection unit 1e. With those elements, the server allocation apparatus 1 controls allocation and deallocation of spare servers 3a, 3b, and 3c in the spare server pool 3, according to variations of demand on each target system belonging to the system group 2. The server management unit 1a, allocation period management unit 1c, allocation candidate nomination unit 1d, and server selection unit 1e may be implemented as an allocation server program to be executed on a computer. If this is the case, the computer offers the processing functions of those elements by executing an allocation server program.

The server management unit 1a monitors operating status of each spare server 3a, 3b, and 3c in the spare server pool 3. The server management unit 1a uses the server management data storage unit 1b to store various pieces of information about the spare servers 3a, 3b, and 3c. The server management unit 1a manages such information as server management data, which may include: monitoring results (e.g., operating time of each server), performance information (e.g., processing power of each spare server), and reliability data (e.g., failure rates, availability, MTTF, MTTR).

The server management data storage unit 1b is a data storage device that stores server management data describing the spare servers 3a, 3b, and 3c in the spare server pool 3.

The allocation period management unit 1c is responsive to entry of demand forecast data or other previously specified information. Upon receipt of such data about a specific target system, the allocation period management unit 1c identifies a capacity shortage period during which the system would not be able to satisfy a reference performance level. This capacity shortage period refers to a period of time when the system needs allocation of all or part of spare servers 3a, 3b, and 3c from the spare server pool 3, and it is thus designated as a dynamic allocation period. The allocation period management unit 1c then informs the allocation candidate nomination unit 1d of this dynamic allocation period. The dynamic allocation period is determined from demand forecasts as mentioned above, or may be previously specified.

With reference to the server management data, as well as to the dynamic allocation period that the allocation period management unit 1c has determined for each system 2a and 2b, the allocation candidate nomination unit 1d calculates failure probability of each spare server 3a, 3b, and 3c, assuming that they are allocated to the systems 2a and 2b during the dynamic allocation period. The allocation candidate nomination unit 1d then selects appropriate spare servers as allocation candidates according to the calculated failure probability. More specifically, some spare servers may exhibit a relatively high probability of failure during the dynamic allocation period. The allocation candidate nomination unit 1d eliminates such spare servers from the set of allocation candidates and notifies the server selection unit 1e of the remaining candidates.

As mentioned above, the server management data storage unit 1b stores server management data of the spare servers 3a, 3b, and 3c. The server selection unit 1e consults this server management data to narrow down the allocation candidates nominated by the allocation candidate nomination unit 1d, so as to select one or more servers that can satisfy some specified requirements for the target system during the dynamic allocation period. The requirements may include those related to performance, reliability, and cost of a target system. Performance requirements may specify a throughput that the system is supposed to offer during the dynamic allocation period. Reliability requirements may specify an availability that the system is expected to attain during the dynamic allocation period. Cost requirements may give an upper limit of expenses, for example. The system administrator specifies those requirements as necessary.

The above-described server allocation apparatus 1 operates as follows. The server management unit 1a monitors operating status of the spare server pool 3 and produces server management data describing the observed operating status of each spare server. The server management unit 1a saves this server management data in the server management data storage unit 1b. The server management data storage unit 1b also stores information about performance of each individual spare server 3a, 3b, and 3c.

In each system 2a and 2b belonging to the system group 2, the system manager 21 measures the amount of demand (e.g., access requests) from clients for which the corresponding service providing section 22 is responsible. Based on the measurement results, the system manager 21 estimates future demand on the target system and supplies the server allocation apparatus 1 with that demand forecast data.

The server allocation apparatus 1 receives demand forecast data or other previously specified information from the systems 2a and 2b. Upon receipt of such data from a particular system 2a or 2b, the allocation period management unit 1c checks the received data with respect to the current performance of that system. If the system is expected to be unable to provide specified performance (or processing capacity), the allocation period management unit 1c determines a capacity shortage period during which the system needs allocation of additional servers from the spare server pool 3. Dynamic allocation periods are determined on an individual system basis, and that information is sent to the allocation candidate nomination unit 1d. The allocation candidate nomination unit 1d then nominates a set of allocation candidates for each requesting system (or target system) eliminating spare servers with a high probability of failure during the determined dynamic allocation period. More specifically, the allocation candidate nomination unit 1d reads server management data of each spare server from the server management data storage unit 1b and estimates its failure probability during the determined dynamic allocation period by consulting a predetermined reliability parameter (e.g., MTTF) in the server management data. Based on this estimate, the allocation candidate nomination unit 1d chooses a set of allocation candidates and notifies the server selection unit 1e of them. The server selection unit 1e determines which candidates to allocate to the target system, based on the server management data, such that those servers will satisfy the requirements of the target system during their dynamic allocation period. That is, the allocated spare servers are supposed to compensate for an expected shortage of processing capacity of the target system during the dynamic allocation period. Note that the requirements for performance and reliability of servers may vary from system to system.

When the determined dynamic allocation period is reached, the server allocation apparatus 1 allocates previously selected servers to the requesting system 2a and 2b. Upon expiration of that dynamic allocation period, the allocated servers are deallocated from the system and returned to the spare server pool 3.

As can be seen from the above explanation, the server allocation apparatus according to the present embodiment predicts a dynamic allocation period and determines which spare servers to allocate to the requesting system while eliminating spare servers with a high failure probability during that period from the set of allocation candidates. This feature reduces the risk that the target system will encounter a failure of spare servers during the period when they are allocated to that system. The present embodiment therefore ensures the system's reliability during the period, besides satisfying performance requirements.

Internet Data Center

Figure 2:
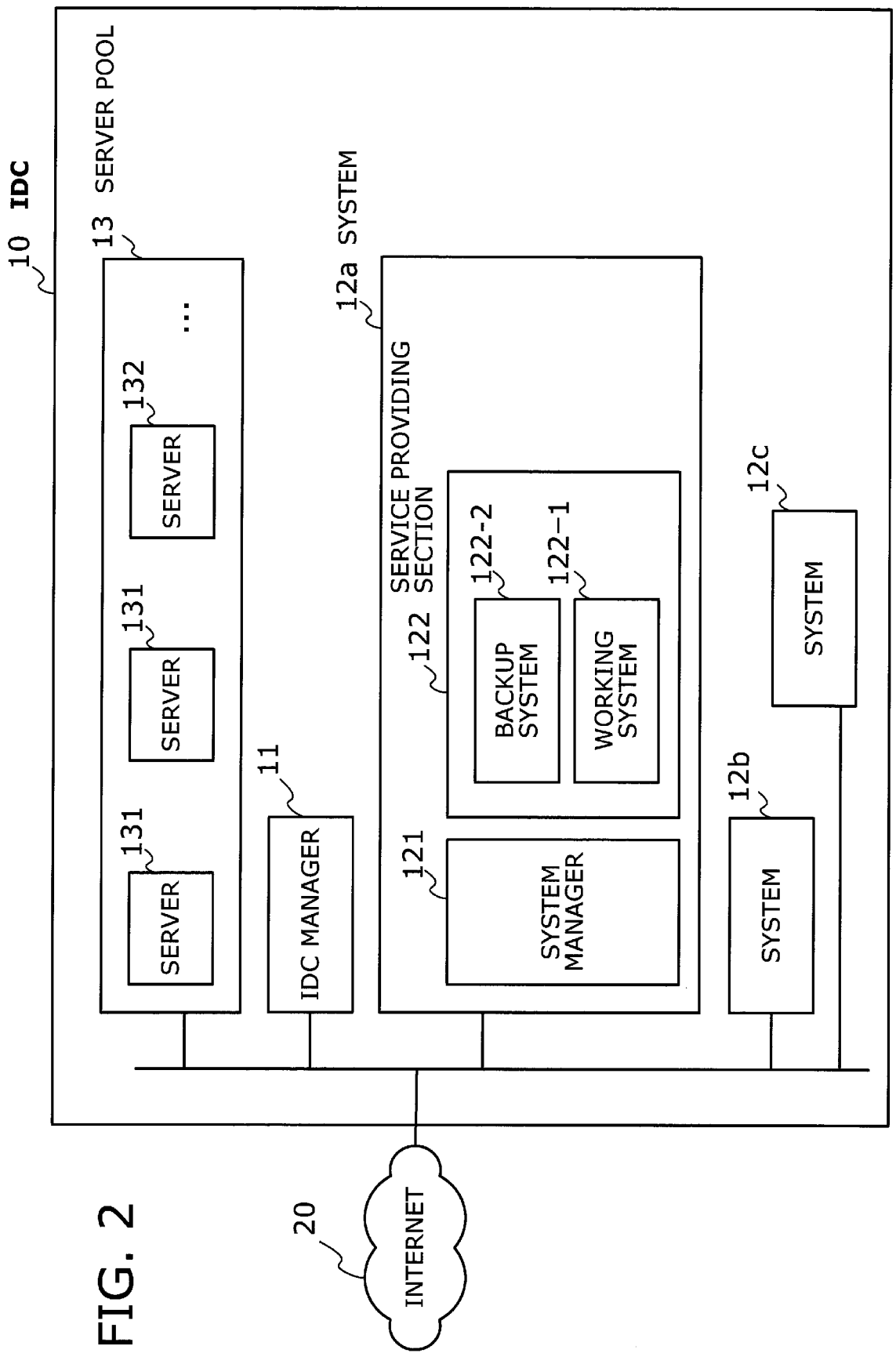
FIG. 2 illustrates an IDC according to an embodiment of the invention.

Referring now to FIG. 2 and subsequent drawings, an embodiment applied to an Internet data center (IDC) will be described in detail below. FIG. 2 illustrates an IDC according to an embodiment of the present invention. The illustrated IDC 10 includes the following elements: an IDC manager 11 that allocates and manages servers; systems 12a, 12b, and 12c that provide services; and a server pool 13 that manages spare servers 131, 132, and 133. With these elements, the IDC 10 processes requests from clients (not illustrated in FIG. 2) on the Internet 20.

The IDC manager 11 manages the entire operation of the IDC 10. In addition to this, the IDC manager 11 acts as a server allocation apparatus that allocates spare servers 131, 132, and 133 from the server pool 13 to a specific target system 12a, 12b, and 12c during a dynamic allocation period when the target system 12a, 12b, and 12c needs more processing power.

The illustrated system 12a is one of those that may request and receive an allocation of servers. The system 12a includes a system manager 121, and a service providing section 122. The service providing section 122 is further divided into a working system 122-1 that actually performs service processes and a backup system 122-2 that will be activated when the working system 122-1 encounters server failure. The working system 122-1 and backup system 122-2 usually employ a minimum required number of servers. Other systems 12b and 12c have a similar structure. Those systems 12a, 12b, and 12c may, however, be configured in various ways, depending on for what applications they are intended.

The server pool 13 is a concept for managing spare servers 131, 132, and 133 collectively. Upon demand, some of those spare servers 3a, 3b, and 3c are allocated to requesting systems. When the demand falls off, the allocated servers are deallocated from the systems and returned to the server pool 13.

Hardware Platform for Servers

Figure 3:
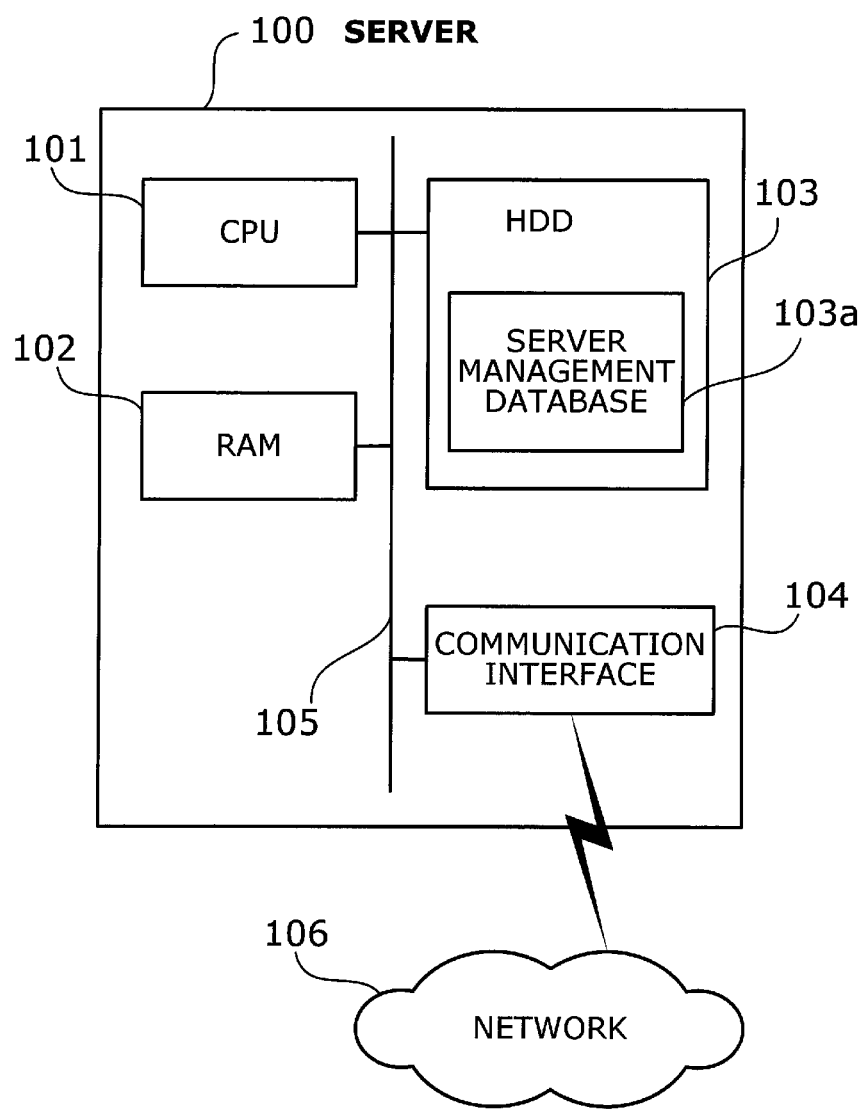
FIG. 3 is a block diagram illustrating an example hardware configuration of a server according to the present embodiment.

Before going into details of each processing element mentioned above, the following will describe a hardware platform of servers constituting an IDC. FIG. 3 is a block diagram illustrating an example hardware configuration of a server according to the present embodiment. While not depicted in FIG. 2, the server 100 illustrated in FIG. 3 is a part of the IDC manager 11.

The server 100 includes the following components: a central processing unit (CPU) 101, a random access memory (PAM) 102, a hard disk drive (HDD) 103, and a communication interface 104. The CPU 101 controls the entire hardware of this server 100 by interacting with other components via a bus 105.

The RAM 102 serves as temporary storage for the whole or part of operating system (OS) programs and application programs that the CPU 101 executes, in addition to other various data objects manipulated at runtime. The HDD 103 stores program and data files of the operating system and applications. In the present example, the HDD 103 also accommodates a server management database 103a. Alternatively, this server management database 103a may be located in an external storage device accessible to other servers. The communication interface 104 is connected to a network 106, allowing the CPU 101 to exchange data with other servers in the IDC 10 via the network 106. The network 106 may be a local area network (LAN) used to interconnect servers within the IDC 10 or an outside network such as the Internet. The communication interface 104 may be configured to support both types of networks as needed.

The above-described hardware platform is used to realize the processing functions of the present embodiment. The hardware of the server 100 can also be applied to the systems 12a, 12b, and 12c, as well as to the servers 131, 132, and 133.

Target System Structures

This section presents several example structures of systems 12a, 12b, and 12c and describes how they are handled by a server allocation method according to an embodiment of the invention. As mentioned earlier, those systems 12a, 12b, and 12c may be configured in various ways, depending on for what applications they are intended. This section describes a server allocation method that can be applied (but not limited) to a non-redundant single-layer system, a non-redundant multilayer system, and a redundant multilayer system. It is assumed here that the allocation of servers is supposed to satisfy, not only performance and reliability requirements, but also the customers' requirement on overall system availability, represented by A_x.

FIGS. 4A and 4B illustrate examples of non-redundant system configuration. Specifically, FIG. 4A illustrates a single-layer system x1, and FIG. 4B a multilayer system x2.

Single-layer system x1 of FIG. 4A includes a minimum number of servers s1, s2, . . . , and sn (where n is an integer) to provide specified performance for a single layer (layer α). The overall availability A_x1 of this system x1 is calculated as the product of availabilities of individual servers. That is, A_x1 is expressed as follows:

$$A\_x1 = a1 \times a2 \times \ldots \times an \tag{1}$$

where a1, a2, . . . an represent the availability of each server.

Multilayer system x2 of FIG. 4B, on the other hand, is formed from a plurality of layers α, β, . . . , λ each providing particular services. Each individual layer includes a minimum number of servers to provide specified performance in that layer, as in the single-layer system of FIG. 4A. The overall availability A_x2 of this system x2 is calculated as the product of individual layers' availabilities, each of which is calculated according to formula (1). That is, A_x2 is expressed as follows:

$$A\_x2 = A\_x\alpha \times A\_x\beta \times \ldots \times A\_x\lambda \tag{2}$$

where A_xα, A_xβ, . . . , A_xλ represent the availability of individual layers.

FIG. 5 illustrates an example of a redundant multilayer system x3. This system x3 includes a working system and a backup system. The working system includes two servers s1 and s2 in layer α and one server s3 in layer β. The backup system, on the other hand, includes a server s4 to take over the tasks of a working server s1, s2, or s3 in the event of failure. Generally, the number N of backup servers is often smaller than the number M of working servers (referred to as "M:N protection") so as to minimize the inefficiency of redundant configuration. In this case, backup servers may support working servers belonging to the same single layer. They may also support working servers in different layers. The example system of FIG. 5 offers one backup server s4 for three working servers s1, s2, and s3 arranged in two different layers. Since no one can tell which working server would fail, the backup server has to be comparable to or outperform the most powerful server in the working system.

The presence of such a backup system is taken into consideration when calculating availability of the overall system. In the case where the backup system is formed from a plurality of layers, all those layers are taken as a single layer for the purpose of calculation.

In the case of system x3 illustrated in FIG. 5, one backup server s4 backs up three working servers s1, s2, and s3. Accordingly, this system x3 has the following four operating patterns:

(a) All systems s1-s3 are working.

$$A\_x3a = a1 \times a2 \times a3$$

(b) Systems s1 and s2 are working, while s4 backs up failed s3.

$$A\_x3b = a1 \times a2 \times (1-a3) \times a4$$

(c) Systems s1 and s3 are working, while s4 backs up failed s2.

$$A\_x3c = a1 \times (1-a2) \times a4 \times a3$$

(d) Systems s2 and s3 are working, while s4 backs up failed s1.

$$A\_x3d = (1-a1) \times a4 \times a2 \times a3$$

By adding up the above values, the overall availability of system x3 will be:

$$\begin{aligned} A\_x3 &= A\_x3a + A\_x3b + A\_x3c + A\_x3d \\ &= a1 \times a2 \times a3 + a1 \times a2 \times a4 + a1 \times a3 \times a4 + \\ &\quad a2 \times a3 \times a4 - 3 \times a1 \times a2 \times a3 \times a4 \end{aligned} \quad (3)$$

The server allocation method according to the present embodiment manages allocation of servers so as to satisfy a given requirement for the availability of a target system, which is calculated in the way described above. The proposed server allocation method, however, is not limited to this availability-based control. Rather, other reliability parameters may be used in allocating servers. For example, the proposed server allocation method may operate in a similar way to the above by using a failure rate F_x (which is expressed as F_x=1−A_x) to control allocation of servers.

IDC Manager and System Manager

Figure 6:
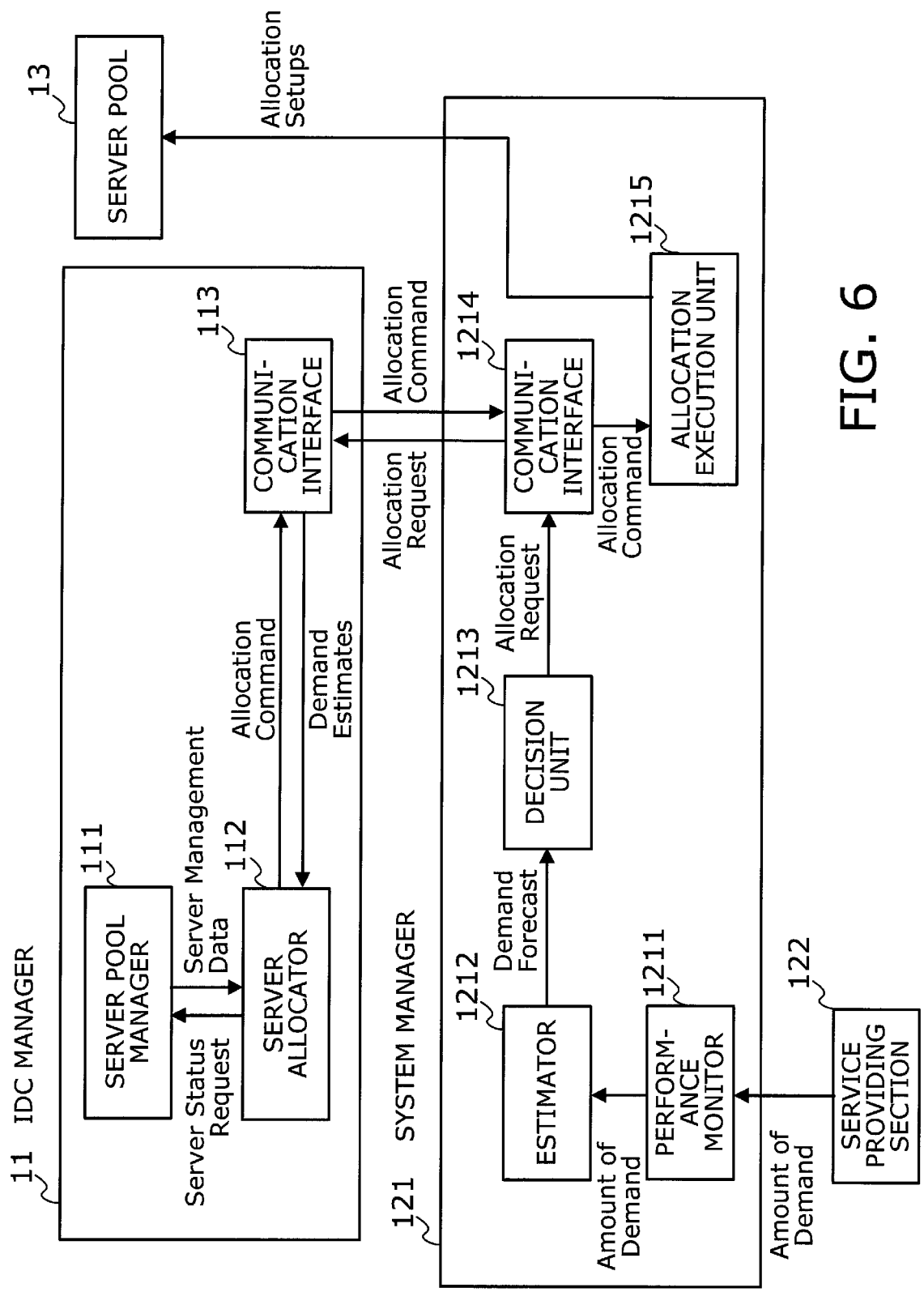
FIG. 6 illustrates an IDC manager and a system manager according to the present embodiment.

Referring to the block diagram of FIG. 6, the details of the IDC manager 11 and system manager 121 will be described below. Some elements depicted in FIG. 6 correspond to those discussed in FIG. 2, where like reference numerals refer to like elements. The explanation of such elements will not be repeated here. The following description assumes that the availability of a system is used as a key reliability factor.

According to the present embodiment, the IDC manager 11 includes a server pool manager 111, a server allocator 112, and a communication interface 113. The server pool manager 111 functions as the server management unit 1a discussed earlier in FIG. 1 to monitor the condition of each server 131, 132, and 133 in the server pool 13. More specifically, the server pool manager 111 collects information about each server 131, 132, and 133 and saves the collected information in a server management database (not illustrated). This information, or server management data, includes, but not limited to, the following items: model, performance index, MTTF, continuing run time (CRT), remaining continuing run time (RCRT), availability, and allocation status. CRT of a server refers to the time elapsed since the server started up, and RCRT refers to the remaining time before the server stops due to a failure. RCRT is estimated from CRT and MTTF. More details of the server management data will be discussed in a later section.

The server allocator 112 functions as the allocation period management unit 1c, allocation candidate nomination unit 1d, and server selection unit 1e described earlier in FIG. 1. The server allocator 112 is responsive to allocation requests from the system manager 121, which may be accompanied by demand forecasts. Upon receipt of such an allocation request and demand forecast via the communication interface 113, the server allocator 112 commands the server pool manager 111 to retrieve server management data relevant to the request. The server allocator 112 then determines which servers to allocate to the requesting system, based on the retrieved server management data and the received demand forecast. The server allocator 112 begins this allocation process with determining a dynamic allocation period for the requesting system. The server allocator 112 then assesses individual spare servers based on the server management data, in terms of the probability that they may fail during the determined dynamic allocation period. If it is found that some spare servers may probably fail during the dynamic allocation period, the server allocator 112 eliminates them from the set of allocation candidates. The requesting system may be a non-redundant system or a multilayer system. In the former case, the server allocator 112 narrows down the allocation candidates to select appropriate servers that satisfy the system's performance requirement during the dynamic allocation period. In the latter case, the server allocator 112 makes a selection of servers on an individual layer basis, depending on how much performance boost is needed in each layer. The server allocator 112 may further eliminate ineligible servers, considering other requirements specified by UC users.

Now that the candidates for server allocation have been nominated, the server allocator 112 selects those satisfying a performance requirement specified by the UC user. This selection also takes a reliability requirement into consideration. More specifically, the server allocator 112 calculates availability of the target system, including each additional server that may be allocated to that system. This process of selection and calculation is repeated until the server allocator 112 finds a satisfactory solution for the specified availability.

Suppose, for example, that an allocation request has been issued for the redundant system 12a (FIG. 2) having a working system 122-1 and a backup system 122-2. In this case, the server allocator 112 allocates servers to the working system 122-1 so as to satisfy its performance requirement in the first place. The server allocator 112 then turns to the backup system 122-2 to allocate servers thereto, such that a specified reliability requirement can be satisfied by the target system 12a as a whole.

In the case where the working system 122-1 is formed from multiple layers, the server allocator 112 selects servers, as mentioned above, depending on how much performance boost is needed in each layer. Upon completion of this performance-based allocation for the working system 122-1, the server allocator 112 then evaluates overall reliability of the target system 12a. If the calculated reliability falls short of the requirement, the server allocator 112 tries another server selected from among the candidates, so that a satisfactory combination of servers is found.

As can be seen from the above discussion, the server allocator 112 allocates spare servers to the backup system according to reliability requirements after allocating spare servers to the working system according to performance requirements. This feature of the present embodiment makes it possible to allocate servers to a backup system without human intervention. When the time comes for the allocation, the server allocator 112 issues an allocation command to the system manager 121 via the communication interface 113.

The communication interface 113 allows the server allocator 112 to communicate with external entities. Specifically, the server allocator 112 uses the communication interface 113 to receive allocation requests from the system manager 121 and send an allocation command to the system manager 121. The communication interface 113 also works for the server pool manager 111 in delivering status information from the server pool 13.

As mentioned earlier, the IDC manager 11 uses status information and demand forecasts of requesting systems 12a, 12b, and 12c, as well as status information of the server pool 13. Those pieces of information may be obtained in various ways. In the foregoing examples, status information and demand forecasts are received together with an allocation request via the communication interface 113. The present embodiment is, however, not limited to this specific configuration. One alternative method is, for example, to build a shared database for the target systems to write their own information. The server allocator 112 then reads necessary information from this database when it selects servers. The same mechanisms may also apply to server management data describing spare servers. That is, the IDC manager 11 employs a server pool manager 111 to collect status information from each spare sever. Or alternatively, the spare servers may be configured to write their own status information in a shared database, so that the server pool manager 111 can read the information as necessary.

The system manager 121 includes a performance monitor 1211, an estimator 1212, a decision unit 1213, a communication interface 1214, and an allocation execution unit 1215. The performance monitor 1211 monitors the amount of requests from clients to the service providing section 122. The estimator 1212 estimates future demand based on the data obtained by the performance monitor 1211. The decision unit 1213 determines whether it is necessary to request a dynamic allocation of servers from the server pool 13, based on demand forecasts obtained from the estimator 1212. If so, the decision unit 1213 produces and sends an allocation request to the IDC manager 11 via the communication interface 1214.

The communication interface 1214 allows the decision unit 1213 and other blocks constituting the system manager 121 to communicate with the IDC manager 11. Specifically, this communication interface 1214 is used to send an allocation request from the decision unit 1213 to the IDC manager 11 and receive and forward an allocation command from the system manager 121 to the allocation execution unit 1215. The communication interface 1214 also delivers an allocation completion notice from the allocation execution unit 1215 to the IDC manager 11

The allocation execution unit 1215 executes allocation and deallocation of specified servers from/to the server pool 13. This operation of the allocation execution unit 1215 takes place in response to an allocation command received from the IDC manager 11 via the communication interface 1214. Upon completion, the allocation execution unit 1215 notifies the IDC manager 11 of the execution results.

FIG. 7 illustrates a server management database according to the present embodiment. This server management database may be located in a storage device of the IDC manager 11 to store information about each server in the server pool 13. The stored information includes both time-invariant properties and time-variant status information of servers. The latter information is collected by the server pool manager 111. More specifically, the database records include the following data fields: "Server ID" 201, "Model" 202, "Performance Index" 203, "Reliability Data" 204, "Allocation Cost" 205, and "Allocation Status" 206.

Each record describes a specific server identified by the Server ID field 201. Specifically, the model field 202 indicates the machine model of that server, and the performance index field 203 contains a value representing the server's performance. For example, the performance index field 203 indicates the number of service requests that the server can handle per unit time. Those pieces of data are inherent properties of servers, which are previously entered to the corresponding data fields.

The reliability data field 204 contains some parameters representing reliability of the server, which include, for example, MTTF, CRT, RCRT, and availability. MTTF refers to an average interval of failures that the server may experience. CRT refers to the time elapsed since the server started up. RCRT refers to a remaining time before the server stops due to a failure. This RCRT is calculated from MTTF and CRT as follows:

$$RCRT = MTTF - CRT \qquad (4)$$

Availability refers to the ratio of the total time in which the server is operable during a given interval. MTTF and availability may vary from server to server. CRT and RCRT change with time and thus updated regularly by the server pool manager 111. In the example of FIG. 7, server s3 exhibits a CRT of 504. Since its MTTF is 720, the remaining time, RCRT, before the next failure is 216. If this RCRT is exhausted (i.e., reaches zero), it means that the server is likely to stop due to some error or the like. In other words, a server with a small RCRT could reach the point of RCRT=0 during its estimated capacity shortage period. Such a server is likely to fail during the period of dynamic allocation. It is therefore possible to increase the probability of avoiding failure by eliminating, from the set of allocation candidates, all servers whose RCRT will be exhausted before the system's estimated capacity shortage period expires.

The allocation cost field 205 indicates the cost of dynamic allocation, or more specifically, the amount due to the vendor per unit time. This value is used as the basis of payment calculation.

The allocation status field 206 indicates whether the corresponding server is being allocated to a specific target system. This status information is updated each time the server pool manager 111 executes allocation or deallocation of a server. The example of FIG. 7 indicates that server s4 is currently working in system x2, while others are unallocated.

Figure 8:
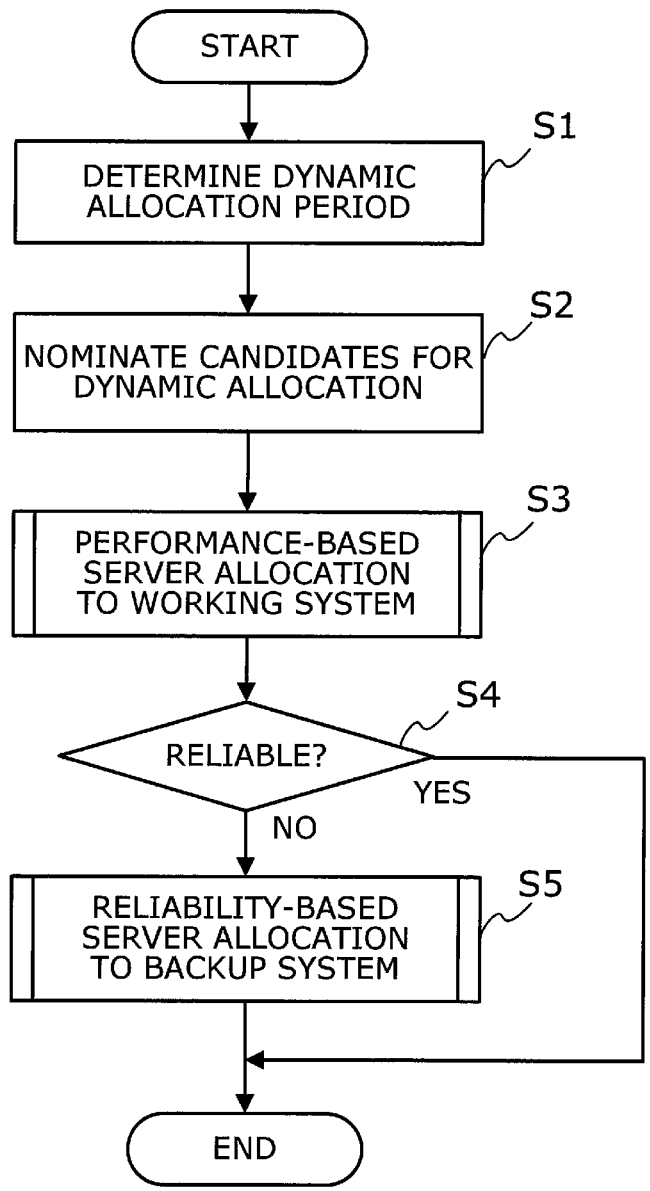
FIG. 8 is a flowchart of a server allocation process according to the present embodiment.

The above-described IDC 10 executes the following server allocation process and method. FIG. 8 is a flowchart of a server allocation process according to an embodiment of the present invention. This process performs dynamic allocation of servers for a specific target system while satisfying both performance and reliability requirements during their allocation period.

In the IDC manager 11, the server allocator 112 starts a server allocation process upon receipt of an allocation request and demand forecast from the system manager 121. The process flow of determining which servers to allocate is broadly divided into the following three stages: allocation candidate selection process (step S2), working system allocation process (step S3), and backup system allocation process (step S5). The following explains the process flow step by step.

(Step S1) Step S1 determines when to allocate servers. The target system normally operates on a default set of servers. Step S1 compares the performance of this normal system configuration with an expected demand based on a given demand forecast. If the expected demand exceeds the normal performance during a certain time period, then that period is regarded as an estimated capacity shortage period. This estimated capacity shortage period will be a dynamic allocation period, so that the additional server resources, when allocated, will aid the target system to maintain its normal performance level. Alternatively, this dynamic allocation period may be specified by the UC user. If this is the case, step S1 uses that user-defined dynamic allocation period.

Now that the dynamic allocation period is determined, the following steps allocate spare servers to the target system.

(Step S2) Step S2 nominates candidates for dynamic server allocation, taking into consideration the probabilities of servers failing during the period of their assignment. Of all servers available in the server pool 13, some servers may have a high probability of failure during the dynamic allocation period. Step S2 selects servers as allocation candidates while eliminating such failure-prone servers. More specifically, step S2 consults the allocation status filed 206 of the server management data illustrated in FIG. 7 to identify and eliminate servers that have already been allocated to some system. Step S2 then consults the reliability data 204 to identify and eliminate servers whose RCRT is shorter than the dynamic allocation period. The surviving servers are thus nominated as allocation candidates. If there are other requirements specified by the UC user, step S2 may further eliminate ineligible servers that do not satisfy those user-specified requirements. For example, the UC user may place emphasis on the operating cost, specifying a screening condition that eliminates symmetric multiple processor (SMP) servers as being ineligible for allocation candidates because of their high allocation cost. In this case, step S2 eliminates SMP servers regardless of their RCRT values.

(Step S3) Based on performance requirements, Step S3 allocates spare servers to the working system to compensate for the shortage of processing capacity. In the case the target system is composed of a plurality of layers, step S3 first identifies which layers need more server resources. Step S3 then selects those layers one by one in ascending order of the working system availability. To this selected layer, step S3 allocates a server(s) selected from among the set of allocation candidates as satisfying the performance requirement. Details of this performance-based allocation will be described in a later section.

(Step S4) Step S4 calculates reliability of the working system to which the previous step S3 has allocated servers, by using an indicator specified in the given reliability requirement. The calculated reliability is then compared with a specified reliability requirement to determine whether the system is reliable enough. If the system's reliability is satisfactory, it means that no further server allocation is necessary, and accordingly, the process is terminated at this step S4. If it turns out to be unsatisfactory, the process proceeds to step S5. In the case where the target system has no redundancy, the process is terminated regardless of its reliability.

(Step S5) As the third stage mentioned above, step S5 allocates spare servers to the backup system to satisfy the reliability requirement. Reliability of a system can be increased by adding servers to its backup system. Step S5 thus determines which server to allocated to which layer of the backup system. Specifically, step S5 begins server allocation at the layer with the lowest reliability and goes up to higher layers until the specified reliability can be achieved by the target system as a whole.

With the above-described processing steps, the IDC manager 11 assesses demand forecasts of a specific target system and determines when the target system needs more server resources to cope with an unusual excessive demand on the system. To avoid slowdown of the target system, the IDC manager 11 allocates spare servers to its working system by selecting them in accordance with a given performance requirement while eliminating spare servers whose operating times would exceed their MTTF during the determined dynamic allocation period. The IDC manager 11 further allocates spare servers to the backup system (if present) according to a given reliability requirement. These features of the proposed IDC manager 11 reduce the probability of failure of servers during the period of their dynamic allocation. Advantageously, the IDC manager 11 offers server allocation based on both performance and reliability requirements.

Allocation Based on Performance and Reliability

Figure 9:
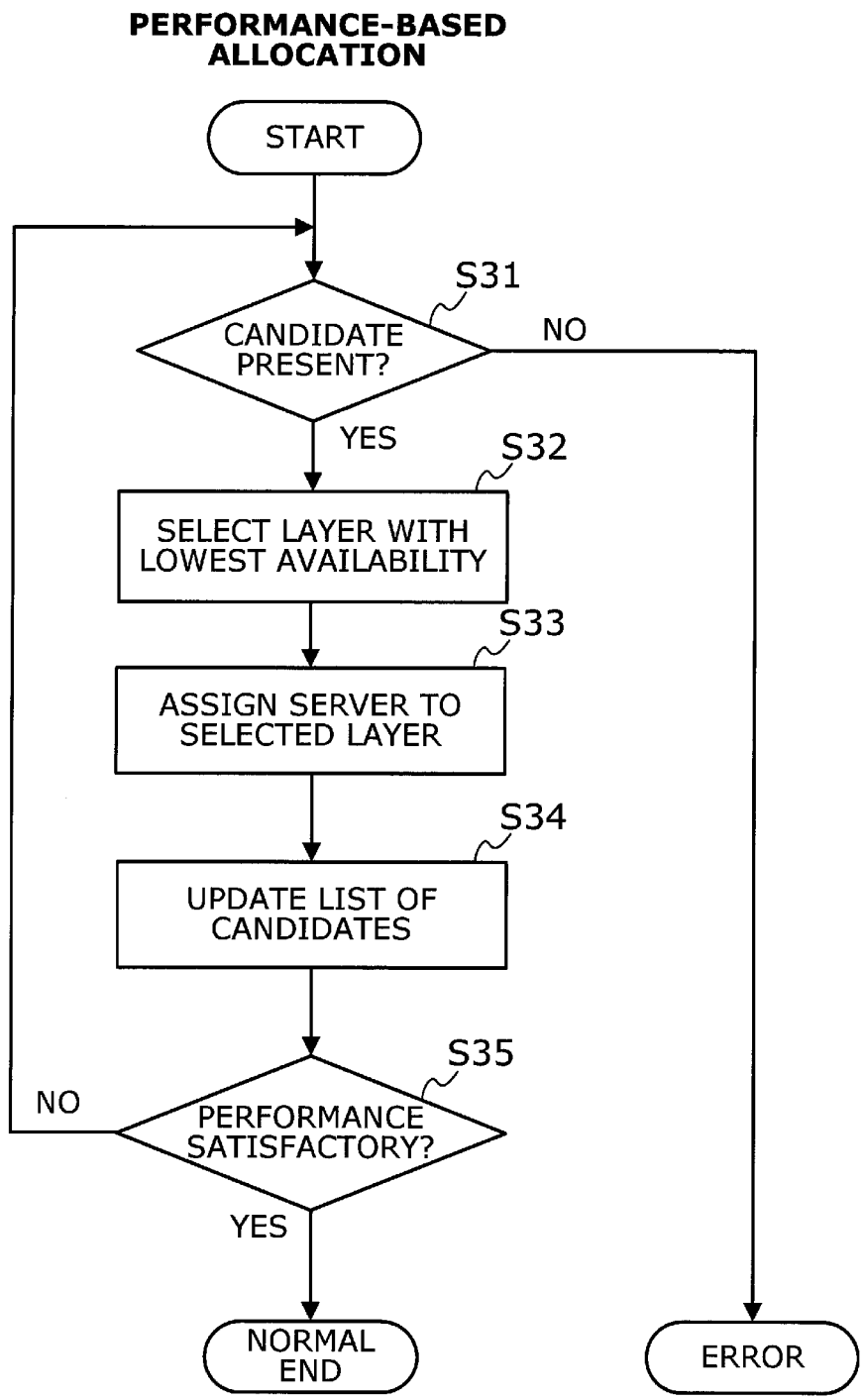
FIG. 9 is a flowchart of a server allocation process for a working system according to the present embodiment.
Figure 10:
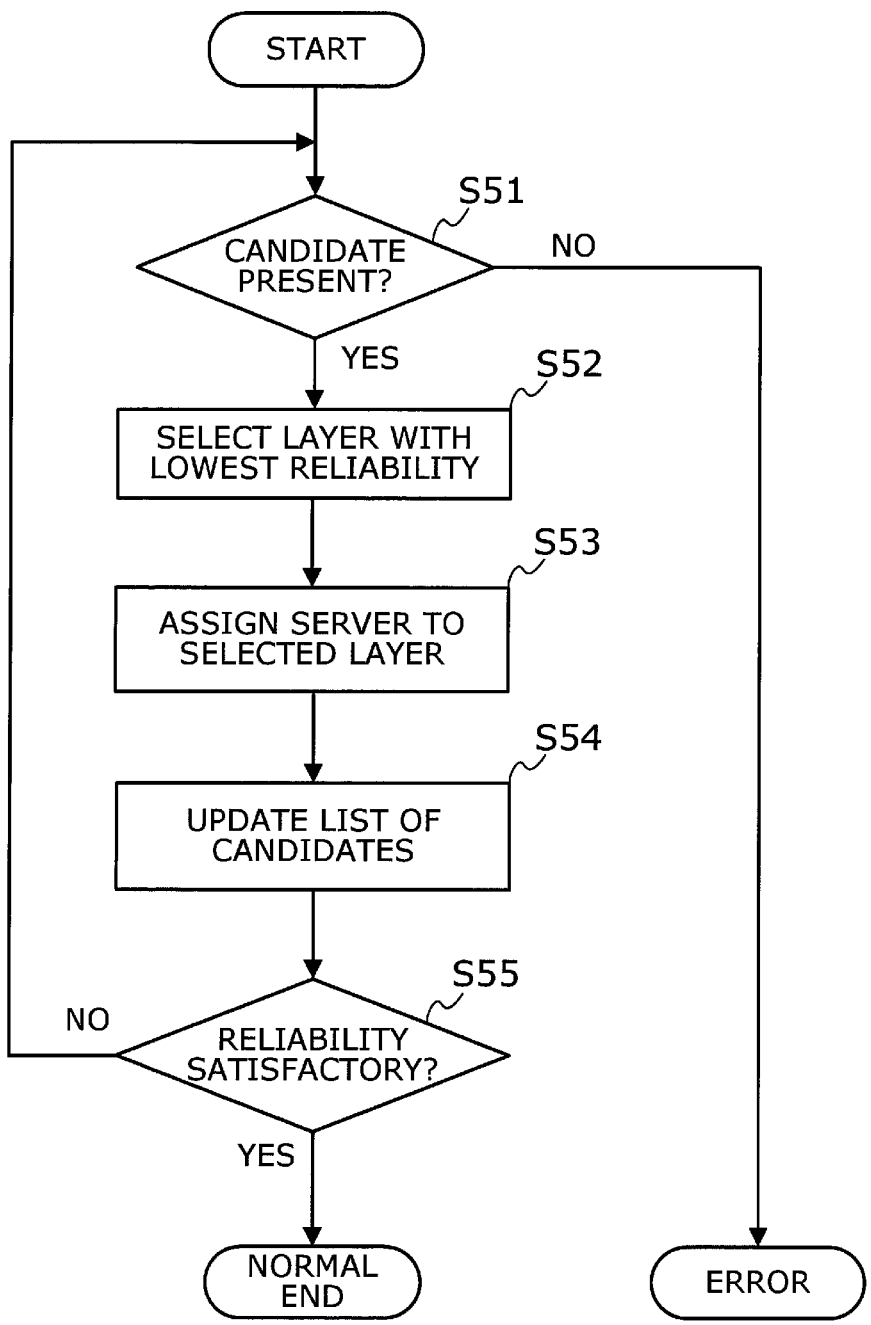
FIG. 10 is a flowchart of a server allocation process for a backup system according to the present embodiment.

Referring now to the flowcharts of FIGS. 9 and 10, this section describes in detail the working system allocation process (step S3) and backup system allocation process (step S5).

FIG. 9 is a flowchart of a server allocation process for a working system according to the present embodiment. This process is invoked after allocation candidates are selected at step S2 (FIG. 8).

(Step S31) Step S31 determines whether there is an unallocated server in the set of allocation candidates. More specifically, step S31 consults the allocation status field 206 of the server management data illustrated in FIG. 7 in an attempt to find a server that is not allocated to any systems. If no such servers are found, the present process is unable to proceed to further steps. The process is thus terminated, with indication of an error.

(Step S32) If an unallocated candidate is present, this step S32 identifies the target system layers which need more processing resources and then selects one of those layers whose working system exhibits the lowest availability.

(Step S33) Step S33 assigns an appropriate server to the layer selected at step S32. Since the selected layer has the lowest availability at the moment, step S33 chooses a server with the best availability from among the remaining candidates, thereby raising the availability of that layer.

(Step S34) Step S34 updates the set of allocation candidates by removing those used at step S33, as well as other inappropriate servers if any.

(Step S35) Step S35 assesses performance of the target system including spare servers allocated at step S33. If the target system fails to satisfy the performance requirement, the process returns to step S31 to allocate another spare server. If the target system exhibits an improved performance as expected, then the process is terminated normally.

The above-described process enables dynamic allocation of spare servers until the overall performance of the target system reaches a specified level. The process allocates a server with the highest availability to the layer with the lowest availability in preference to others, thus shoring up the availability of the target system as a whole. In the case where step S31 is unable to find allocatable servers, the process is terminated with indication of an error and skips subsequent sever allocation for backup system.

FIG. 10 is a flowchart of a server allocation process for a backup system according to the present embodiment. This process is invoked when the preceding step S4 (FIG. 8) has determined that the reliability of the target system is not good enough.

(Step S51) Step S51 determines whether there is an unallocated server in the set of allocation candidates. If no such servers are found, the present process is unable to proceed to further steps. The process is thus terminated with indication of an error.

(Step S52) If an unallocated candidate is found, this step S52 selects one layer of the target system which exhibits the lowest reliability.

(Step S53) Step S53 assigns an appropriate server(s) to the layer selected at step S52. Since the selected layer has the lowest reliability at the moment, this step S53 chooses a server with the best availability, as well as a sufficient performance, from among the remaining candidates and allocates that server to the backup system. A backup server is supposed to replace a failed working server, no matter how much performance the failed server had. Accordingly, step S53 selects a server that has a performance comparable to or higher than the most powerful working server, besides providing the highest availability.

(Step S54) Step S54 updates the set of allocation candidates by removing those used at step S53, (Step S55) Step S55 assesses reliability of the target system including additional backup servers allocated at step S53. If the target system fails to satisfy the reliability requirement, the process returns to step S51 to allocate another spare server to the backup system. If the target system satisfies the reliability requirement, then the process is terminated normally.

The above-described process enables dynamic allocation of spare servers to the backup system until the overall reliability of the target system reaches a specified level.

As can be seen from the above, the present embodiment executes a dynamic allocation candidate selection process, working system allocation process, and backup system allocation process sequentially. The targets system can therefore satisfy both performance and reliability requirements.

The present embodiment includes processing steps of selecting allocation candidates and updating the set of those candidates. These steps remove inappropriate servers, together with allocated servers, from the server pool as being not eligible for dynamic allocation to the target system. As handled in step S2 of FIG. 8, what is inappropriate for the system is, for example, a short RCRT that would expire before that system enters a period that needs more servers. Spare servers unable to satisfy requirements specified by UC users may also be removed from the set of candidates.

The above-described process includes a possibility of exhausting allocation candidates. For example, the foregoing performance-based allocation and reliability-based allocation may end up with an error as indicated in FIGS. 9 and 10, respectively. It is not possible in such cases to allocate sufficient servers as specified by the user. The user may, however, allow some alternatives which could be satisfied even in those cases. For example, the user may relax the reliability requirement or accept some amount of cost increase. It is up to the user to decide whether to permit alternatives and what alternatives to use. If there is a user-specified alternative, the allocation process re-executes server selection by using that alternative. This feature of the present embodiment makes it possible to allocate servers, taking into consideration the balance between reliability requirements and other requirements.

Example of Dynamic Server Allocation

This section will present a more specific example for explanation of the proposed server allocation process.

Figure 11:
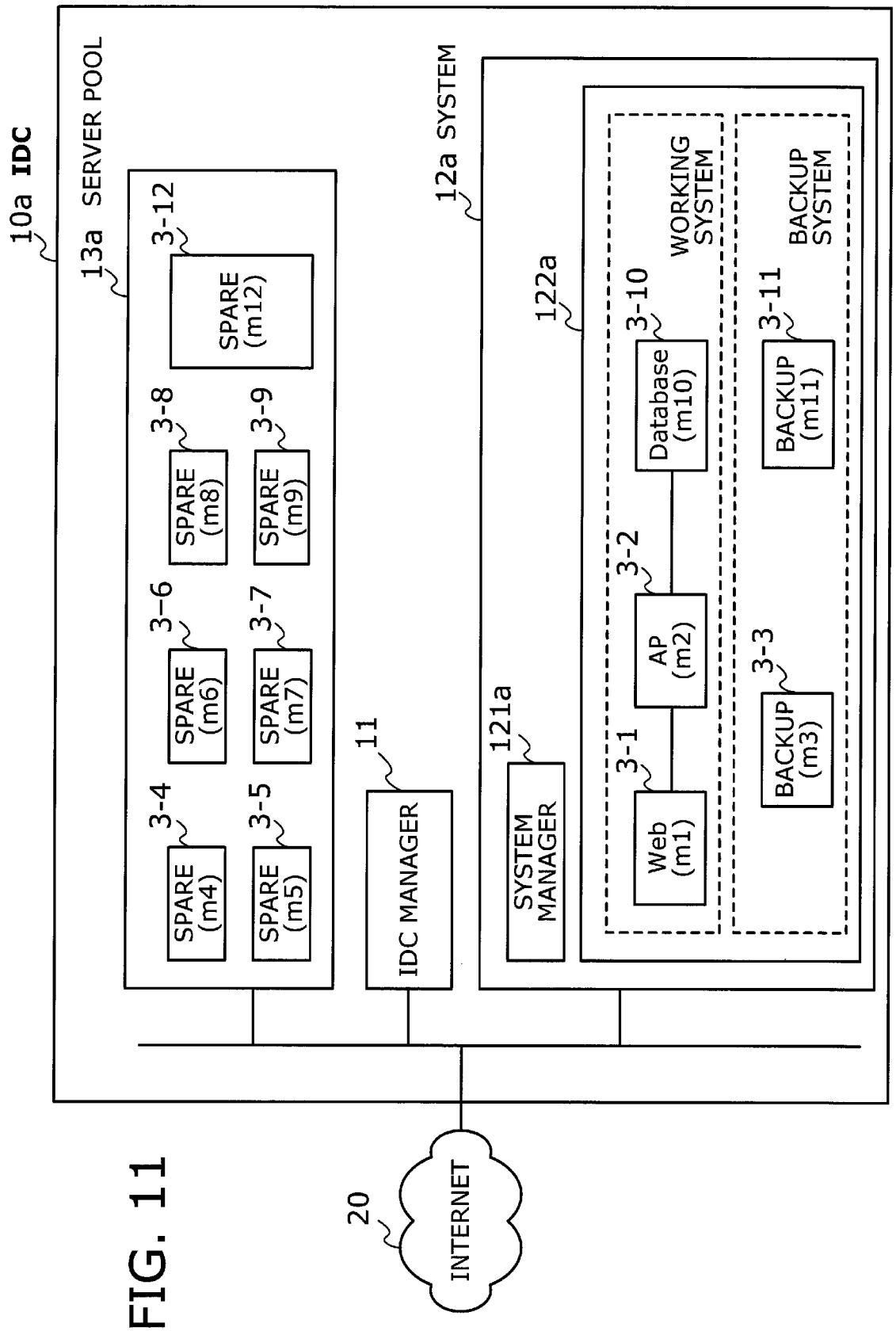
FIG. 11 is a block diagram of an IDC according to another embodiment directed to a redundant multilayer system.

FIG. 11 is a block diagram of an IDC according to an embodiment directed to a redundant multilayer system. Some elements depicted in FIG. 11 correspond to those discussed in FIG. 2, where like reference numerals refer to like elements. The explanation of such elements will not be repeated here.

The illustrated IDC 10a is a multilayer system which includes the following elements: a system 12a to provide services to clients in response to requests received over the Internet 20, a server pool 13a to manage spare servers for use in an expected capacity shortage period of the system 12a, and an IDC manager 11. The system 12a includes a system manager 121a and a redundant system 122a, the latter being formed from Web, AP, and Database layers.

The IDC 10a provides twelve servers m1 to m12. Their corresponding respective reference numerals 3-1 to 3-12 are parenthesized in this section. Of those twelve servers, five servers m1 (3-1), m2 (3-2), m3 (3-3), m10 (3-10), and m11 (3-11) are currently allocated to the system 12a. More specifically, the working system includes m1 (3-1) in Web layer, m2 (3-2) in AP layer, and m10 (3-10) in Database layer. Further, the backup system reserves m3 (3-3) for Web and AP layers and m11 (3-11) for Database layer. The remaining seven servers m4 (3-4) to m9 (3-9) and m12 (3-12) are reserved in the server pool 13a. It is assumed here that the UC user specifies an availability of 0.995 as a minimum requirement for the system's reliability.

FIG. 12 illustrates an example of server management data corresponding to the multilayer system of FIG. 11. For each of the above-noted twelve servers in the system of FIG. 11, the illustrated server management data 210 provides data formed from the following fields: "Model," "Performance Index" (service requests that can be handled in each unit time)," "Reliability Data" (e.g., MTTF, CRT, RCRT, availability), and "Allocation Status." This server management data 210 indicates that the IDC 10a provides two different models of servers. One model is T1 (m1 to m9), and the other is T2 (m10 to m12). These two models have different performance indices, 50 for T1 and 90 for T2. The server management data 210 further indicates that servers may have different reliability data even in the same model.

The IDC 10a executes the server allocation process discussed in an earlier section with reference to the flowchart of FIG. 8. That is, the IDC 10a first determines a dynamic allocation period according to step S1. Specifically, the system manager 121a estimates future demand on the system 122a.

FIGS. 13A, 13B, and 13C illustrate demand forecasts for the multilayer system of FIG. 11. Specifically, FIG. 13A is a graph indicating how the estimated demand varies with time. FIG. 13B is a table indicating expected system state at time point t0. FIG. 13C is a table indicating expected system state at time point t2 when the system experiences a peak demand.

The graph of FIG. 13A represents demand forecasts, where the vertical axis represents the amount of demand, and the horizontal axis represents time. Future demand is estimated at each estimation point (t0, t1, t2, t3, t4, . . . ti). If the demand forecast indicates a shortage of performance at a future time point, the IDC 10a schedules dynamic allocation of servers. Note that estimation is performed at discrete intervals. Accordingly, in order to overcome the expected underperformance during a period between ti and ti+1 (i is an integer), it is necessary to execute allocation at the time point of ti.

In the example of FIG. 13A, the demand estimation interval is 24 hours. The bold line in this graph represents a regular performance index 401, which indicates the amount of service requests that the default set of servers can handle. The dotted line represents estimated demand 402, which is predicted from the data of actual demand observed in the past. As can be see from the curve of FIG. 13A, there will be a capacity shortage period 403 from t0 to t3. This 72-hour period is when the system needs dynamic allocation of servers.

Referring to FIG. 13B, the illustrated system state table 410 represents a system state at time point t0. The system is under the normal operating condition at this point, where the estimated demand is below the system's allocated performance. In contrast to this, another system state table 411 illustrated in FIG. 13C indicates that an increased estimated demand would exceed the allocated performance in both Web and AP layers at the peak-demand point (t2). The estimated capacity shortage period 403 begins before t1, necessitating allocation of additional server resources at t0. The IDC 10a thus moves to step S2.

At step S2, candidates for dynamic server allocation are selected. From demand forecasts or other specified requirements, it has been determined when the target system will need allocation of servers. In the present example, the demand forecast indicates that the target system needs additional servers during a 72-hour period from t0 to t3 as mentioned above. The IDC 10a thus selects unallocated servers in the server pool 13a as candidates for allocation, while eliminating servers whose RCRT is shorter than the above period. Referring back to the server management data 210 illustrated in FIG. 12, its RCRT field indicates that every unallocated server m4 (3-4), m5 (3-5), m6 (3-6), m7 (3-7), m8 (3-8), m9 (3-9), and m12 (3-12) has an RCRT of at least 72 hours. This means that there are no ineligible servers.

At step S3, the IDC 10a performs performance-based server allocation to the working system. This process first determines whether there are unallocated candidates. In the present example, the server pool 13a contains several unallocated servers, the IDC 10a then looks into the system state table 411 to identify a layer with the minimum availability in the working system. The system state table 411 indicates that Web and AP layers need more processing power, and it is Web layer that exhibits the smallest availability. The IDC 10b thus focuses on Web layer and determines which server to allocate to that layer. Specifically, the IDC 10a consults the server management data 210 to compare unallocated servers m4 to m9 and m12 in the server pool 13a in terms of their availabilities. As a result, server m4 (3-4) is singled out for allocation because of its highest availability. The set of allocation candidates is then updated accordingly. That is, the selected server m4 (3-4) is removed from the list, while other servers m5 (3-5) to m9 (3-9) and m12 (3-12) remain unallocated.

The IDC 10a then assesses the system performance, assuming that the selected server m4 (3-4) is added to Web layer of the working system. FIGS. 14A and 14B each illustrate a state of the multilayer system of FIG. 11 after the allocation of servers. Specifically, FIG. 14A is a system state table representing system state at t2, where server m4 has been allocated. FIG. 14B is a system state table representing system state at t2, where another server m5 has also been allocated.

The original state at t2 is indicated in the system state table 411 of FIG. 13C. By allocating server m4 to the working system, the target system will be changed as indicated by a new system state table 412 of FIG. 14A. This system state table 412 contains server m4 (3-4) and its performance index in the resource configuration and system performance fields, respectively. Specifically, the performance of Web layer has been increased to 100 as a result of the addition of 50 (newly allocated server m4) to 50 (existing server m1), which is sufficient for handling the estimated demand, 80. The system state table 412, however, still indicates that AP layer falls short of performance. Accordingly, the IDC 10a repeats the second stage from its very beginning.

The IDC 10a checks the presence of servers in the server pool 13a. In the present example, six servers m5 (3-5) to m9 (3-9) and m12 (3-12) remain unallocated, of which m5 (3-5) exhibits the highest availability. The IDC 10a thus selects m5 (3-5) for allocation to AP layer and updates the set of allocation candidates by removing therefrom the selected m5. The other five servers m6 (3-6) to m9 (3-9) and m12 (3-12) remain in the server pool 13a.

The IDC 10a then assesses the system performance after the allocation of m5 (3-5) to AP layer. FIG. 14B illustrates a system state table 413 representing system state at t2, which is different from that of FIG. 14A in that server m5 has been added to AP layer. This system state table 413 contains m5 (3-5) and its performance index in the resource configuration and system performance fields corresponding to AP layer. Specifically, the performance of AP layer has been increased to 100 as a result of the addition of 50 (newly allocated server m5) to 50 (existing server m2), which is sufficient for handling the estimated demand, 60.

The above-described process has allocated servers such that the target system can handle the expected peak demand at time point t2. The IDC 10a then advances to step S4 to determine whether the system satisfies a given reliability requirement.

FIGS. 15A and 15B illustrate availability of the multilayer system of FIG. 11 after server allocation. Specifically, FIG. 15A gives a system availability table 421 representing availability of the target system after a performance-based server allocation process is performed. The system availability is calculated by using the foregoing formula (3). The illustrated system availability table 421 indicates a single availability value for Web and AP layers since those layers are backed by a single backup server m3 (3-3). As this system availability table 421 indicates, the availability of Web and AP layers is 0.9915. The overall system availability involving Database layer is 0.9909. This means that the target system fails to satisfy the specified reliability requirement (i.e., minimum system availability of 0.995). The test at step S4 therefore results in "NO," which thus brings the IDC 10a to step S5.

At step S5, the IDC 10a performs a reliability-based allocation process to add servers to the backup system. This process first determines whether there are unallocated candidates. In the present example, the server pool 13a contains five unallocated servers m6 (3-6) to m9 (3-9) and m12 (3-12). The IDC 10a selects a layer that is the lowest in availability. This is Web-AP layer in the present example, where Web and AP layers share a single backup server. Subsequently the IDC 10a selects a server from among the unallocated candidates m6 (3-6) to m9 (3-9) and m12 (3-12) and allocates it to the backup system. The eligibility conditions for this server are: (a) being the highest in availability, and (b) having an equal or greater performance than the current working server of Web-AP layer. Every server m1 (3-1), m2 (3-2), m4 (3-4), and m5 (3-5) used in the working system has a performance index of 50 in the present example. Unallocated servers m6 (3-6) to m9 (3-9) have a performance index of 50 while m12 (3-12) has a performance index of 90. That is, all the unallocated servers in the server pool 13a satisfy the second eligibility condition noted above. The IDC 10a thus selects and allocates serve m6 (3-6) with the highest availability to the backup system and updates the set of allocation candidates accordingly by removing m6 (3-6). The other four servers m7 (3-7) to m9 (3-9) and m12 (3-12) remain in the server pool 13a.

The IDC 10a then assesses the system performance after the allocation of m6 (3-6) to Web-AP layer in the same way as before. FIG. 15B gives a system availability table 422 representing availability of the target system after a reliability-based server allocation process is performed, where the system availability is calculated by using the foregoing formula (3). The availability of Web-AP layer has increased to 0.9994, and the overall system availability to 0.9976. Since the target system satisfies the reliability requirement, the IDC 10a completes this server selection.

Figure 16:
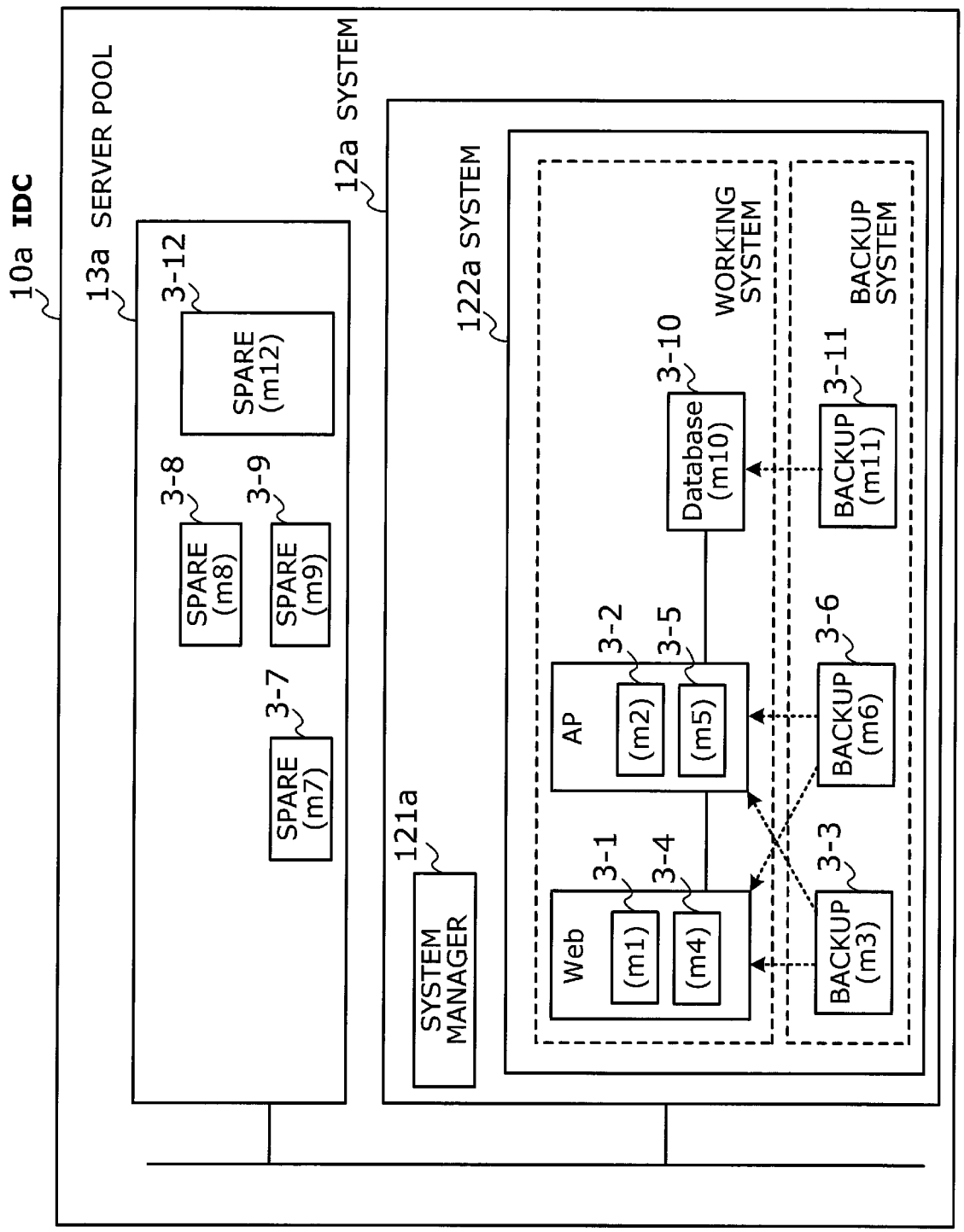
FIG. 16 illustrates allocated servers at the time of peak demand on the multilayer system of FIG. 11.

FIG. 16 illustrates server allocation at the time of peak demand on the multilayer system of FIG. 11. Like reference numerals are added to like elements. Illustrated in FIG. 16 are a system 12a and a server pool 13a, while other elements are omitted.

Compared with its original state before the dynamic server allocation, the system 12a now includes m4 (3-4) in Web layer and m5 (3-5) in AP layer as additional servers of the working system. The system 12a also includes a backup server m6 (3-6) to support Web and AP layers as an additional server of the backup system. Those additional servers permit the system 12a to continue offering sufficient performance even at the time of peak demand, with a reduced possibility of server failure, and with a reliability satisfying the specified requirement.

Balance of Cost and Reliability

The preceding section has described the case where the UC user specifies only a reliability requirement. However, to achieve a high reliability in system operations, it may be necessary to spend more money to increase the number of backup servers. Satisfying a reliability requirement may sometimes cost more than expected. Cost and reliability are both important aspects in operating a system. The decision of whether to place a higher priority on reliability depends on the operating policy of individual systems. The process of dynamic server allocation may therefore take into consideration a balance of cost and reliability. This section describes dynamic server allocation based on both reliability and cost.

Figure 17:
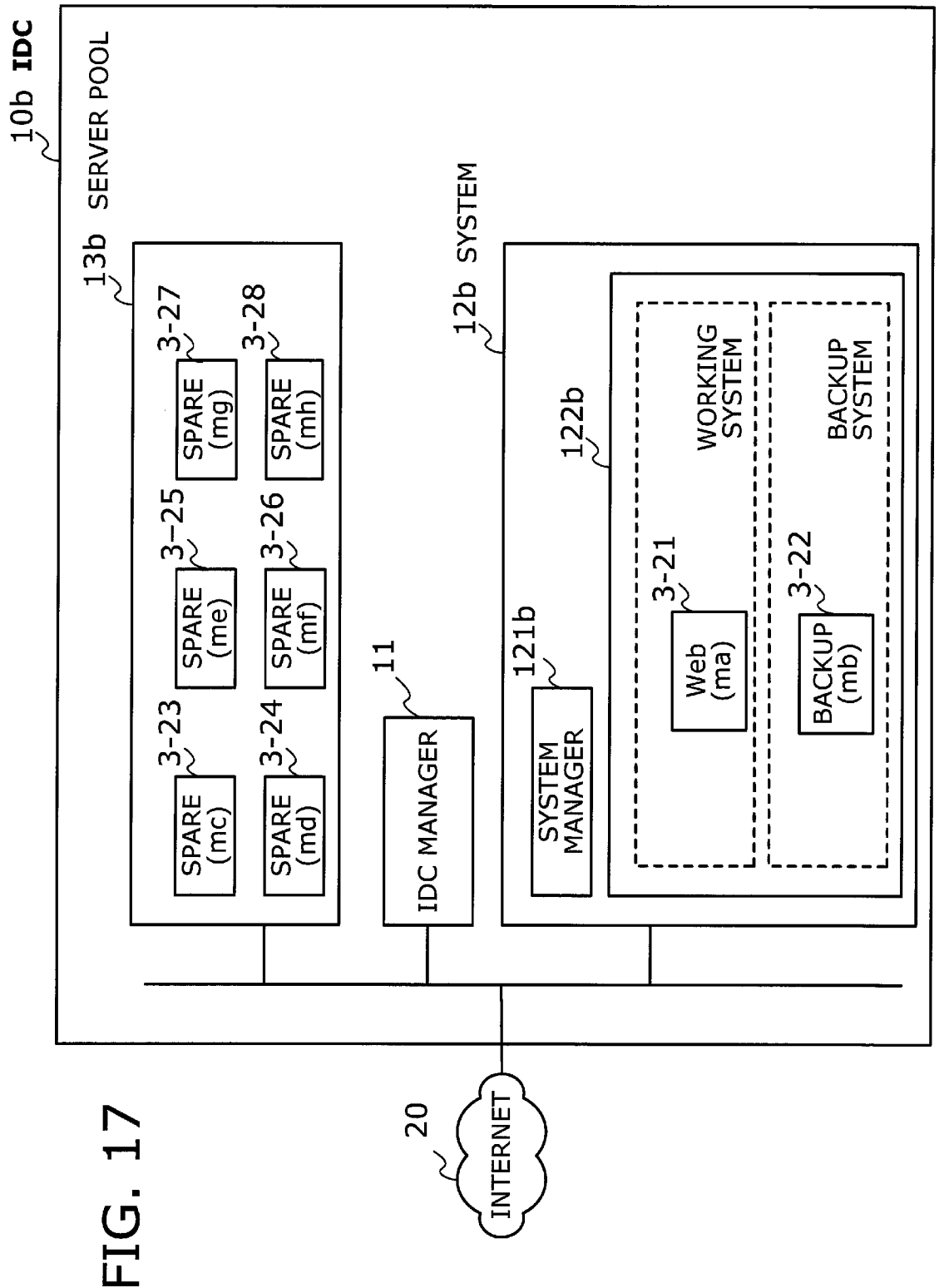
FIG. 17 is a block diagram of a system according to yet another embodiment of the present invention, which provides a balance of reliability and cost in the process of server allocation.
Figure 22:
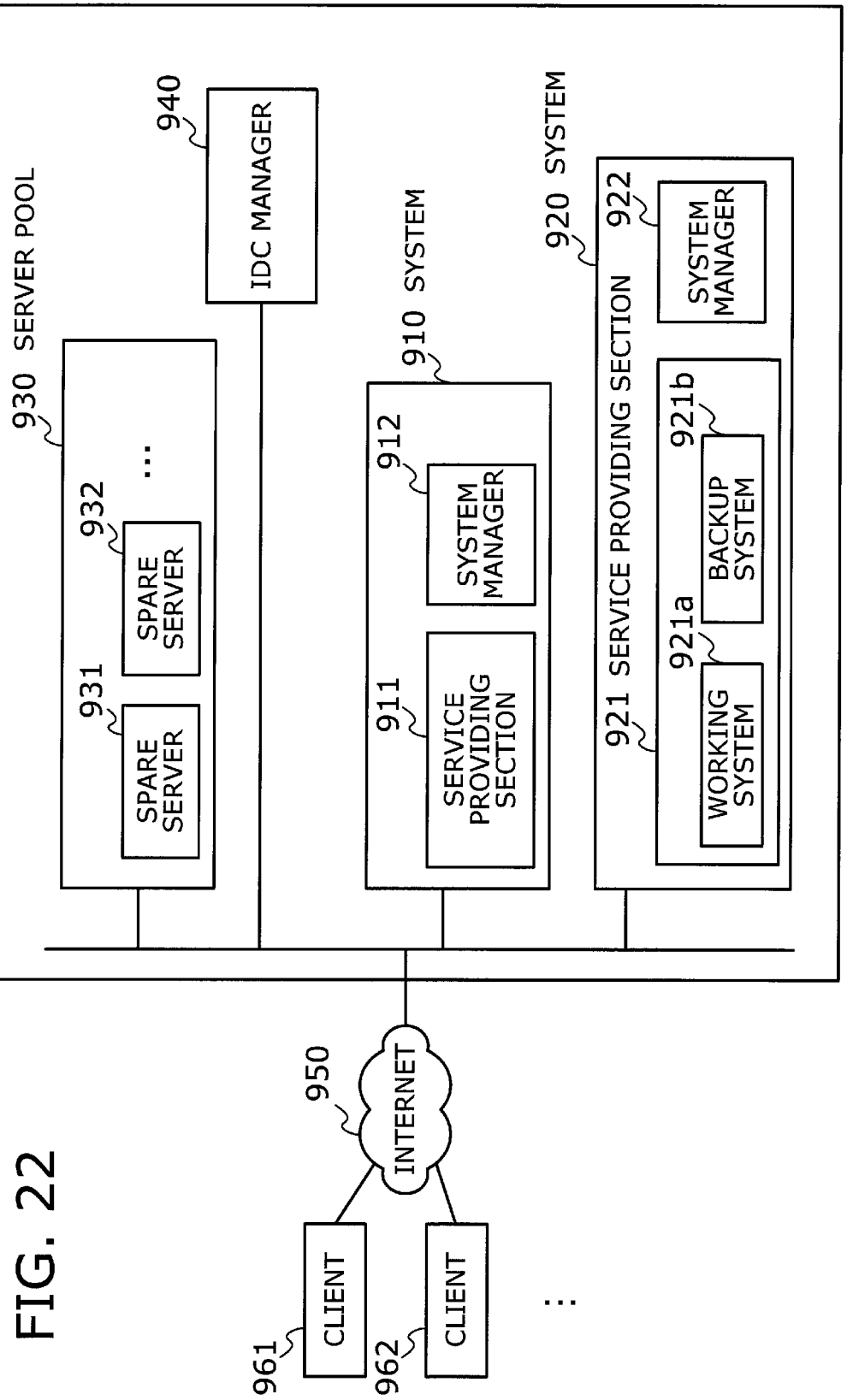
FIG. 22 is a simplified block diagram illustrating a UC environment.

FIG. 17 is a block diagram of a system according to an embodiment of the present invention, which provides a balance of reliability and cost in the process of server allocation. The illustrated IDC 10b differs from the IDC 10a of FIG. 11 in its system 12b and server pool 13b, while they share other elements.

The system 12b in this IDC 10b is a single-layer system formed solely from Web layer. The IDC 10b offers eight servers ma (3-21), mb (3-22), mc (3-23), md (3-24), me (3-25), mf (3-26), mg (3-27), and mh (3-28). The system 12b includes server ma (3-21) in its working system and mb (3-22) in its backup system. These servers have been allocated as regular servers of the system 12b. The server pool 13b stores the remaining six servers mc (3-23) to mh (3-28).

FIG. 18 gives an example of server management data for the system illustrated in FIG. 17. For each of the eight servers noted above, this illustrated server management data 231 provides the following data fields: "Model," "Performance Index" (service requests that can be handled in each unit time)," "Reliability Data" (e.g., MTTF, CRT, RCRT, availability) "Allocation Cost" (per-hour cost of dynamic allocation), and "Allocation Status."

The illustrated server management data 231 indicates that the IDC 10b offers two different models of servers. One model is T1 (ma to mf), and the other is T2 (mg to mh). Model T1 has a performance index of 50 and an allocation cost of y, while model T2 has a performance index of 90 and an allocation cost of 10y. The server management data 231 further indicates that servers may have different reliability data even in the same model.

It is assumed here that the UC user specifies an availability of 0.995 as a minimum requirement for the system's reliability. It is further assumed that the UC user specifies a cost requirement prohibiting the total cost of allocation from exceeding 5y.

The system manager 121b estimates future demand on the system 12a. FIGS. 19A, 19B, and 19C illustrate how the system of FIG. 17 changes. Specifically, FIG. 19A gives a table 510 representing a system state at the time of peak demand. FIG. 19B gives a table representing the same in the case where server mc is allocated. FIG. 19C gives a table 511 representing the same in the case where server md is further allocated. These tables include a data field indicating the total cost of dynamic allocation, in addition to other data fields representing resource configuration, system performance index, and estimated demand.

The IDC 10b now executes the server allocation process discussed earlier with reference to the flowchart of FIG. 8. That is, the IDC 10b first determines a dynamic allocation period according to step S1 by estimating future demand and identifying a period when the performance of the system 12b is insufficient for the expected amount of demand. As can be seen from the table 510 of FIG. 19A, the system 12b is expected to encounter a peak demand of 120 during the capacity shortage period. This demand level is greater than the current performance index 50 of servers ma (3-21) and mb (3-22). Accordingly, the IDC 10b advances to step S2.

At step S2, the IDC 10b selects candidates for dynamic server allocation by comparing RCRT field values of the server management data 231 with the determined dynamic allocation period of the system 12b. The IDC 10b selects eligible unallocated servers in the server pool 13b as candidates for allocation, while eliminating servers whose RCRT is shorter than 72 hours. More specifically, the present server management data 231 (FIG. 18) indicates that servers me (3-25) and mf (3-26) are ineligible. The IDC 10b further applies the cost requirement, which does not allow the total cost of allocation to exceed 5y. Initially the total cost of dynamic allocation is set to zero since there are no dynamically allocated servers. This means that the IDC 10b is allowed to consume 5y in allocating additional servers to the target system 12b. In other words, the candidates that cost 5y or more are to be eliminated as being ineligible. The IDC 10b therefore removes two servers mg (3-27) and mh (3-28) from the set of allocation candidates since the server management data 231 indicates that their allocation cost is 10y.

As a result of the above process, two unallocated servers mc (3-23) and md (3-24) remain as eligible candidates. The IDC 10b now proceeds to step S3 and performs a performance-based server allocation to the working system. It is first determined whether the server pool 13b contains candidates for dynamic server allocation. In the present example, two candidates mc (3-23) and md (3-24) permit the IDC 10b to go on.

The IDC 10b then identifies target system layers which need more processing resources and selects one of those layers whose working system exhibits the lowest availability. Web layer is selected in the present example since the target system 12b is a single-layer system. The IDC 10b then determines which server to allocate to the working system of the selected Web layer. From among the two candidates mc (3-23) and md (3-24), the IDC 10b selects mc (3-23) because of its higher availability, thus updating their allocation status.

Server md (3-24) is now the only candidate since server mc (3-23) has been removed from the set of allocation candidates. The IDC 10b further checks the remaining candidate(s). As a result of allocation of mc (3-23) to the system 12b, the total cost of dynamic allocation amounts to y. The specified cost requirement does not allow the IDC 10b to spend more than 4y for additional server allocation to the system 12b. The IDC 10b thus updates the set of allocation candidates in the server pool 13b by eliminating those that require a dynamic allocation cost of over 4y. In the present example, the only unallocated server md (3-24) is allowed to remain as an allocation candidate since it costs only y (<4y).

The IDC 10b now assesses the performance of the system 12b including the allocated server mc (3-23) with respect to the performance requirement. As can be seen from the system state table 511 of FIG. 19B, the addition of mc (3-23) has brought a new system performance index and total cost of dynamic allocation. The indicated system performance, however, is insufficient for the estimated amount of demand. The IDC 10b therefore repeats step S3 from its very beginning. That is, it is first determined whether the server pool 13b contains unallocated candidates. Since server md (3-24) is unallocated in the present example, the IDC 10b selects this md (3-24) for allocation, thus updating the set of allocation candidates.

The IDC 10b then assesses the performance of the system 12b including the allocated server md (3-24) with respect to the performance requirement. As can be seen from the system state table 512 of FIG. 19C, the addition of md (3-24) has brought a new system performance index and total cost of dynamic allocation. Specifically, the system performance index has increased to 150, which exceeds the estimated demand, 120. The performance-based server allocation has been completed successfully.

The IDC 10b then proceeds to step S4 to assess whether the target system satisfies the given reliability requirement. FIG. 20 indicates availability of the system of FIG. 17 after the performance-based server allocation. The system's overall availability calculated from the foregoing formula (3) amounts to 0.9941, failing to satisfy the reliability requirement (0.995 or more). The test at step S4 therefore results in "NO," which leads the process to step S5.

At step S5, the IDC 10b performs a reliability-based allocation of server to the backup system. The server pool 13b, however, contains no allocation candidates at this moment. The allocation process therefore ends up with an error.

As in this case, introduction of cost requirements may hamper the target system from fulfilling other requirements. To handle such a situation, the UC user is allowed to specify an alternative strategy for circumventing allocation errors. For example, one alternative may specify that a high-performance server be allocated despite its high cost. It is also possible to apply a more cost-conscious alternative that the selected server may be short-lived with respect to the dynamic allocation period. Which alternative is better is, however, a matter of the US user's choice. Accordingly, when it is unable to satisfy a given requirement, the IDC 10b notifies the UC user of that fact before executing an alternative. Or the IDC 10b may be configured to prompt the UC user to choose a preferable alternative when making this notification.

In this way, the IDC 10b allocates servers in accordance with the UC user's intention by allowing him/her to specify an alternative strategy beforehand or in the event of allocation error. Suppose now that the UC user has chosen the cost-conscious alternative mentioned above, which allows selecting a server that may fail during the dynamic allocation period.

FIG. 21 indicates availability of the system of FIG. 17 after the above-noted alternative server allocation is made. The alternative server allocation has modified the choice of allocation candidates at the third stage discussed above. Specifically, two servers me (3-25) and mf (3-26) are selected as allocation candidates. Server me (3-25) is then allocated to the backup system so as to satisfy the reliability requirement. As can be seen from FIG. 21, the overall availability of the target system 12b has been improved to 0.9997, which satisfies the specified reliability requirement (i.e., availability of 0.9995 or more). This alternative solution also satisfies the cost requirement since the total cost of dynamic allocation of the target system 12b is only 3y, which is well below the specified upper limit of 5y.

As can be seen from the above description, the present embodiment is designed to redo a dynamic server allocation according to an alternative strategy if it is unable to satisfy some specified requirement for the allocation. If this is the case, the UC user may be prompted to select a desired alternative. The UC user may also be allowed to specify an alternative beforehand. The present embodiment thus makes it possible to provide a balance of cost and reliability in dynamic server allocation, according the intention of UC users.

Computer-Readable Storage Media

The above-described processing mechanisms of the embodiments are actually implemented on a computer system. Specifically, the functions that a server allocation apparatus is supposed to provide are encoded in the form of computer programs. A computer system executes those programs to provide the intended functions. The programs are stored in a computer-readable medium for the purpose of storage. Computer-readable storage media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO), for example.

Portable storage media, such as DVD and CD-ROM, are suitable for distribution of program products. Network-based distribution of software programs may also be possible, in which case several master program files are made available on a storage device on a server computer for downloading to other computers via a network.

A computer stores necessary software components in its local storage device, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the computer dynamically downloads programs from a server computer when they are demanded and executes them upon delivery.

CONCLUSION

As can be seen from the above-described embodiments, a dynamic allocation period is determined as a period during which the target system needs additional server resources to handle an expected demand. Failure probability of each spare server during this dynamic allocation period is assessed by using a reliability indicator, so as to eliminate failure-prone servers from allocation candidates. Those allocation candidates are further narrowed down by a specified performance requirement that the target system is supposed to satisfy. These features of the embodiments enable the target system to ensure its reliability, besides providing services, during the period when a shortage of processing capacity is expected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A non-transitory computer-readable medium encoded with a server allocation program that performs, when executed on a computer, a process of allocating servers to a target system including a working system and a backup system, the process comprising:
    monitoring operating condition of spare servers that are deallocated from the target system and belong to a spare server pool;
    storing and managing server management data which describes performance and reliability of the spare servers and the operating condition of the spare servers, including operating time of each spare server which indicates continuing run time of that spare server since startup thereof;
    determining, based on demand forecast data or previously specified data about the target system, a dynamic allocation period during which the target system is expected to need allocation of the spare servers;
    calculating a remaining operating time of each individual spare server from the operating time and the reliability of the spare servers described in the stored server management data;
    determining whether a predicted failure time of each of the spare servers comes during the dynamic allocation period or after the dynamic allocation period, by comparing the remaining operating time of each spare server with the dynamic allocation period;
    nominating a set of allocation candidates from the spare server pool, by including therein the spare servers whose predicted failure times are determined to come after the dynamic allocation period, while excluding therefrom the spare servers whose predicted failure times are determined to come during the dynamic allocation period;
    selecting, based on the stored server management data, which allocation candidate to allocate to the target system, such that the selected allocation candidate enables the target system to satisfy a specified performance requirement during the dynamic allocation period;
    allocating the selected allocation candidate to the working system being a group of servers currently working to provide services to clients connected to the target system;
    calculating reliability that the target system as a whole, including the allocated allocation candidate in the working system, is expected to attain during the dynamic allocation period; and
    further allocating one of the other allocation candidates to the backup system being another group of servers to replace some or all of the servers in the working system in case of failure thereof, when the calculated reliability of the target system falls short of a reliability requirement that the target system as a whole, including both the working and backup systems, has to satisfy.

2. The non-transitory computer-readable medium according to claim 1, wherein said nominating eliminates a spare server from the set of allocation candidates if the remaining operating time of that spare server will be exhausted before the dynamic allocation period expires.

3. The non-transitory computer-readable medium according to claim 1, wherein said nominating eliminates a spare server from the set of allocation candidates if that spare server fails to satisfy a previously specified allocation condition.

4. The non-transitory computer-readable medium according to claim 3, wherein:
    the allocation condition includes a cost requirement; and
    said nominating eliminates a spare server from the set of allocation candidates if that spare server fails to satisfy the cost requirement.

5. The non-transitory computer-readable medium according to claim 1, wherein:
    the target system comprises multiple layers of servers; and
    said selecting is performed for each of the layers.

6. The non-transitory computer-readable medium according to claim 1, wherein:
    said selecting selects an allocation candidate that compensates for shortage of processing capacity of the target system during the dynamic allocation period.

7. The non-transitory computer-readable medium according to claim 6, wherein said selecting considers another allocation condition other than the performance requirement when selecting an allocation candidate.

8. The non-transitory computer-readable medium according to claim 6, wherein:
    the target system comprises multiple layers of servers; and
    said selecting comprises:
    identifying a layer exhibiting a lowest reliability, among the layers that fall short of processing capacity,
    allocating an allocation candidate with a highest reliability to the identified layer,
    assessing performance attained by the target system as a result of said allocating, and
    repeating a reliability-based server allocation by using the other allocation candidates if the attained performance fails to satisfy the performance requirement.

9. The non-transitory computer-readable medium according to claim 1, wherein:
    the target system comprises multiple layers of servers; and
    said allocating to the backup system comprises:
    identifying a layer exhibiting a lowest reliability,
    allocating an allocation candidate with a highest reliability to the identified layer,
    assessing reliability attained by the target system as a result of said allocating, and
    repeating a reliability-based server allocation by using the other allocation candidates if the attained reliability fails to satisfy the reliability requirement.

10. The non-transitory computer-readable medium according to claim 9, wherein said allocating to the backup system comprises:

selecting an allocation candidate whose performance is equal to or greater than a server belonging to the working system of the target system.

11. The non-transitory computer-readable medium according to claim 1, the process further comprising:
storing previously an alternative to either or both of the specified performance and reliability requirements; and
determining which allocation candidate to allocate to the target system by selecting an allocation candidate that satisfies the alternative, when none of the allocation candidates can satisfy the specified performance and reliability requirements.

12. The non-transitory computer-readable medium according to claim 11, wherein:
the alternative relaxes either or both of the specified performance and reliability requirements; and
said selecting uses the relaxed requirement according to the alternative.

13. The non-transitory computer-readable medium according to claim 1, the process further comprising:
producing an alternative condition to replace either or both of the specified performance and reliability requirements if said selecting is unable to select an allocation candidate that satisfies the specified performance and reliability requirements; and
presenting the alternative condition to a user of the target system.

14. The non-transitory computer-readable medium according to claim 12, the process further comprising:
producing a plurality of different alternatives to replace either or both of the specified performance and reliability requirements.

15. A method for dynamically allocating servers to a target system including a working system and a backup system, the method comprising:
monitoring operating condition of spare servers that are deallocated from the target system and belong to a spare server pool;
storing and managing server management data which describes performance and reliability of the spare servers and the operating condition of the spare servers, including operating time of each spare server which indicates continuing run time of that spare server since startup thereof;
determining, based on demand forecast data or previously specified data about the target system, a dynamic allocation period during which the target system is expected to need allocation of the spare servers;
calculating a remaining operating time of each individual spare server from the operating time and the reliability of the spare servers described in the stored server management data;
determining whether a predicted failure time of each of the spare servers comes during the dynamic allocation period or after the dynamic allocation period, by comparing the remaining operating time of each spare server with the dynamic allocation period;
nominating a set of allocation candidates from the spare server pool, by including therein the spare servers whose predicted failure times are determined to come after the dynamic allocation period, while excluding therefrom the spare servers whose predicted failure times are determined to come during the dynamic allocation period; and
selecting, based on the stored server management data, which allocation candidate to allocate to the target system, such that the selected allocation candidate enables the target system to satisfy a specified performance requirement during the dynamic allocation period;
allocating the selected allocation candidate to the working system being a group of servers currently working to provide services to clients connected to the target system;
calculating reliability that the target system as a whole, including the allocated allocation candidate in the working system, is expected to attain during the dynamic allocation period; and
further allocating one of the other allocation candidates to the backup system being another group of servers to replace some or all of the servers in the working system in case of failure thereof, when the calculated reliability of the target system falls short of a reliability requirement that the target system as a whole, including both the working and backup systems, has to satisfy.

16. An apparatus for dynamically allocating servers to a target system, the apparatus comprising:
a processing device configured to execute a procedure comprising:
monitoring operating condition of spare servers that are deallocated from the target system and belong to a spare server pool;
storing and managing server management data which describes performance and reliability of the spare servers and the operating condition of the spare servers, including operating time of each spare server which indicates continuing run time of that spare server since startup thereof;
determining, based on demand forecast data or previously specified data about the target system, a dynamic allocation period during which the target system is expected to need allocation of the spare servers;
calculating a remaining operating time of each individual spare server from the operating time and the reliability of the spare servers described in the stored server management data;
determining whether a predicted failure time of each of the spare servers comes during the dynamic allocation period or after the dynamic allocation period, by comparing the remaining operating time of each spare server with the dynamic allocation period;
nominating a set of allocation candidates from the spare server pool, by including therein the spare servers whose predicted failure times are determined to come after the dynamic allocation period, while excluding therefrom the spare servers whose predicted failure times are determined to come during the dynamic allocation period;
selecting, based on the stored server management data, which allocation candidate to allocate to the target system, such that the selected allocation candidate enables the target system to satisfy a specified performance requirement during the dynamic allocation period;
allocating the selected allocation candidate to the working system being a arum of servers currently working to provide services to clients connected to the target system;
calculating reliability that the target system as a whole, including the allocated allocation candidate in the working system, is expected to attain during the dynamic allocation period; and
further allocating one of the other allocation candidates to the backup system being another group of servers to replace some or all of the servers in the working system in case of failure thereof, when the calculated reliability of the target system falls short of a reliability requirement that the target system as a whole, including both the working and backup systems, has to satisfy.

17. A non-transitory computer-readable medium storing a program that causes a computer to execute a procedure, the procedure comprising:
  calculating a remaining operating time of a server of a server pool, based on reliability data of the server;
  judging whether a predicted failure occurrence timing of the server is beyond a period or within the period in which a server group is required to satisfy a certain performance, by comparing the period with the remaining operating time of the server; and
  causing one or more servers of the server pool to be included in the server group based on the judging, wherein a server of the server pool is excluded from the server group when a predicted failure occurrence timing of the server is within the period and a server of the server pool is allowed to be included in the server group when a predicted failure occurrence timing of the server is beyond the period;
  wherein the server group includes working servers currently working to provide services to clients connected to the server group and backup servers to replace some or all of the working servers in case of failure thereof, and said causing includes:
    including one or more servers of the server pool as the working servers in the server group;
    calculating reliability that the server group as a whole is expected to attain during the period; and
    further including one or more servers of the server pool as the backup servers, in the server group when the calculated reliability of the server group falls short of a reliability requirement that the server group as a whole, including both the working and backup servers, has to satisfy.

18. An apparatus comprising:
  a processing device configured to execute a procedure comprising:
    calculating a remaining operating time of a server of a server pool, based on reliability data of the server;
    judging whether a predicted failure occurrence timing of the server is beyond a period or within the period in which a server group is required to satisfy a certain performance, by comparing the period with the remaining operating time of the server; and
    causing one or more servers of the server pool to be included in the server group based on the judging, wherein a server of the server pool is excluded from the server group when a predicted failure occurrence timing of the server is within the period and a server of the server pool is allowed to be included in the server group when a predicted failure occurrence timing of the server is beyond the period;
    wherein the server group includes working servers currently working to provide services to clients connected to the server group and backup servers to replace some or all of the working servers in case of failure thereof, and said causing includes:
      including one or more servers of the server pool as the working servers in the server group;
      calculating reliability that the server group as a whole is expected to attain during the period; and
      further including one or more servers of the server pool as the backup servers, in the server group when the calculated reliability of the server group falls short of a reliability requirement that the server group as a whole, including both the working and backup servers, has to satisfy.

19. The non-transitory computer-readable medium according to claim 1, wherein:
  the server management data includes mean time between failure (MTBF) or mean time to failure (MTTF) to describe the reliability of each of the spare servers; and
  the calculating of the remaining operating time is based on the operating time and the MTBF or MTTF included in the stored server management data.

* * * * *